United States Patent [19]

Pinkham et al.

[11] 3,841,071
[45] Oct. 15, 1974

[54] TOBACCO HARVESTER
[75] Inventors: Jesse R. Pinkham; Arthur G. Cockman, both of Winston-Salem; Jerry Ray Joyce, Kernersville, all of N.C.
[73] Assignee: R. J. Reynolds Tobacco Company, Winston-Salem, N.C.
[22] Filed: June 5, 1972
[21] Appl. No.: 259,899

Related U.S. Application Data
[63] Continuation-in-part of Ser. No. 100,958, Dec. 23, 1970, abandoned.

[52] U.S. Cl. .............................................. 56/27.5
[51] Int. Cl. .......................................... A01d 45/16
[58] Field of Search ............ 131/27, 28, 55, 56, 57, 131/138, 139; 198/167, 25, 127, 160, 103; 214/5.5, 500, 512, 108, 95; 171/116, 133, 118; 56/27.5, 185, 153, 181–184, 327 R, 328 R, 364, 330, 208, 28, 44, 35

[56] References Cited
UNITED STATES PATENTS

| 130,227 | 8/1872 | Locke | 198/160 |
| 820,335 | 5/1906 | Bailey | 131/139 |
| 1,731,826 | 10/1929 | Morava | 56/44 |
| 2,665,019 | 1/1954 | Lorimer | 214/512 |
| 2,828,825 | 4/1958 | Johnson | 171/118 |
| 2,841,947 | 7/1958 | Grew | 56/327 R |
| 2,876,610 | 3/1959 | West et al. | 56/27.5 |
| 2,952,370 | 9/1960 | Long | 214/5.5 |
| 3,272,309 | 9/1966 | Reading | 198/167 X |
| 3,360,260 | 12/1967 | Rapparlie et al. | 198/167 X |
| 3,417,556 | 12/1968 | Jones et al. | 56/27.5 |
| 3,473,311 | 10/1969 | Fox | 56/330 |
| 3,507,103 | 4/1970 | Pickett et al. | 56/27.5 |
| 3,512,346 | 5/1970 | Mecklin et al. | 56/44 |
| 3,601,959 | 8/1971 | Pinkham | 56/27.5 |
| 3,603,064 | 9/1971 | Pinkham | 56/27.5 |

Primary Examiner—Russell R. Kinsey
Attorney, Agent, or Firm—Cooper, Dunham, Clark, Griffin & Moran

[57] ABSTRACT

Apparatus for defoliating vertically limited sections of tobacco plants, including a harvester vehicle capable of straddling two rows of tobacco plants and a defoliator means mounted on the vehicle to engage the stalks of one of the two straddled rows and strip the leaves therefrom. The defoliator means comprises a pair of defoliators, each including flexible rotating helical webs having scalloped edges. A leaf removal means or lateral conveyor is provided under each defoliator, in the form of a wire chain conveyor for conveying the leaves to a longitudinal conveyor, running lengthwise of the harvester, for conveying the leaves to a collecting receptacle.

25 Claims, 37 Drawing Figures

INVENTORS
JESSE R. PINKHAM
ARTHUR G. COCKMAN
JERRY R. JOYCE
BY Lester H. Clark
ATTORNEY

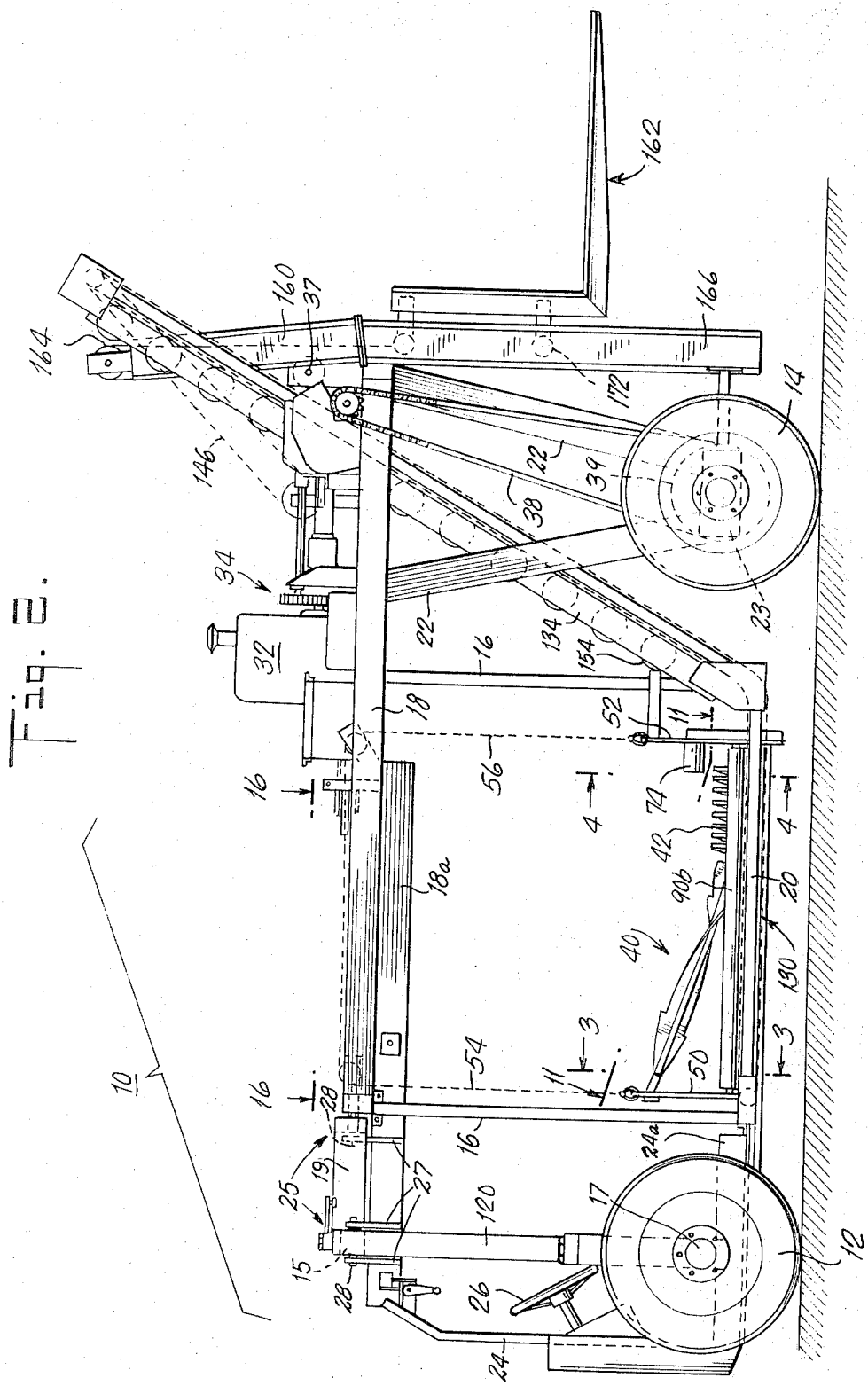

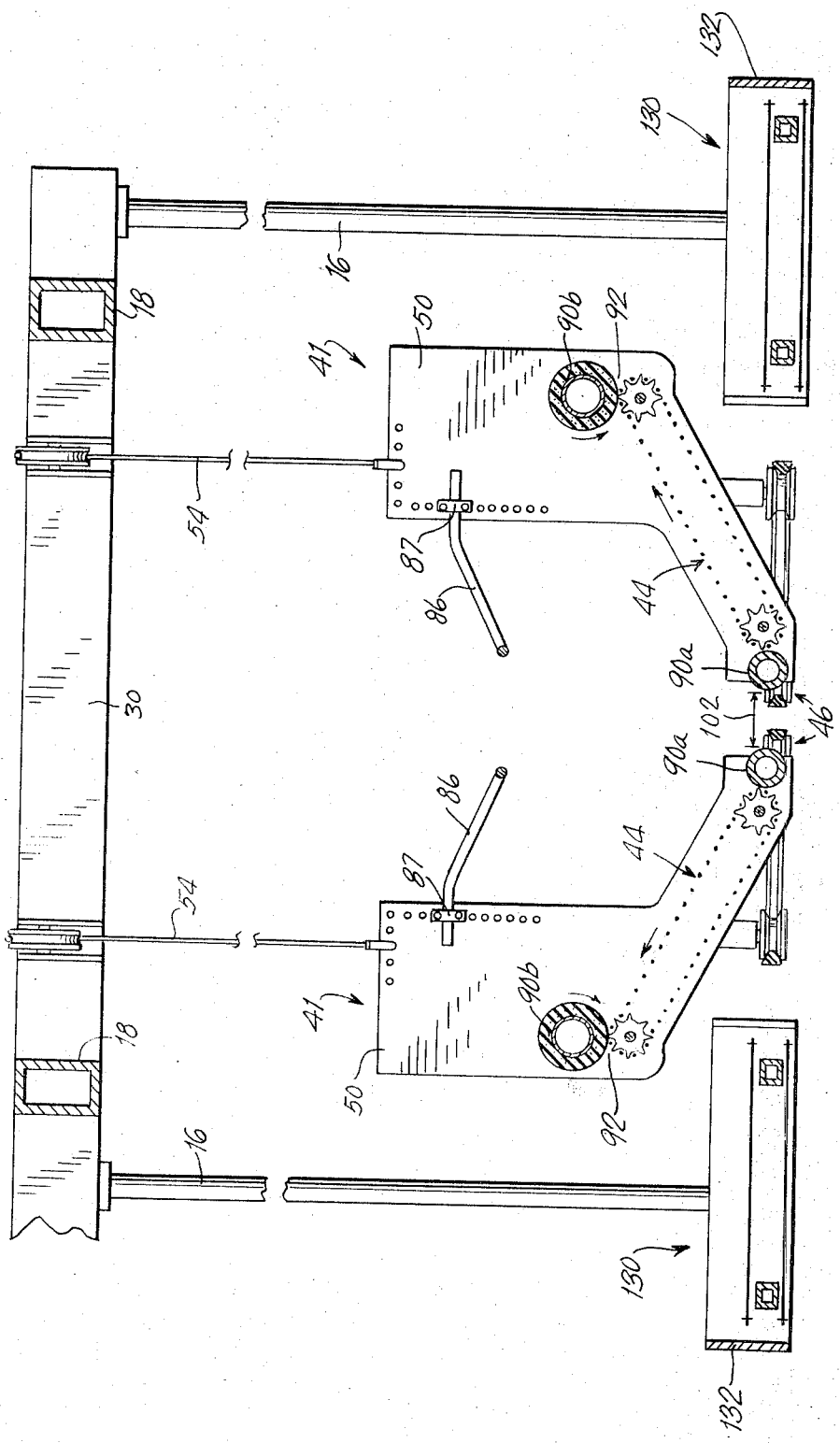

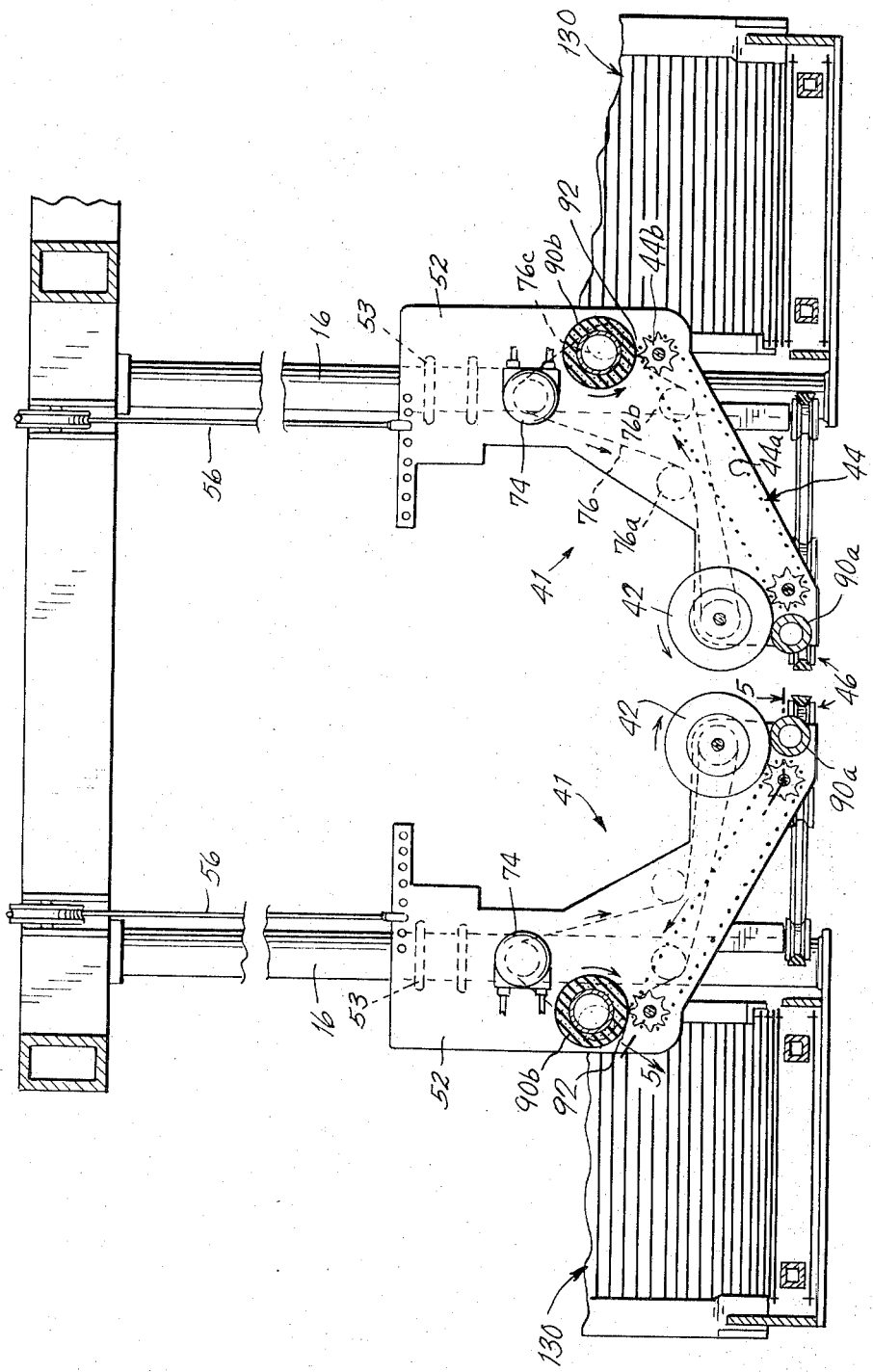

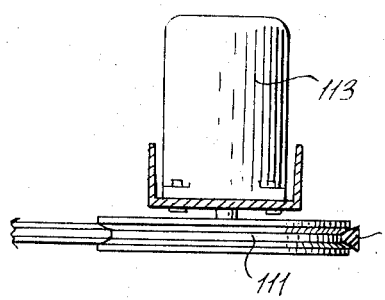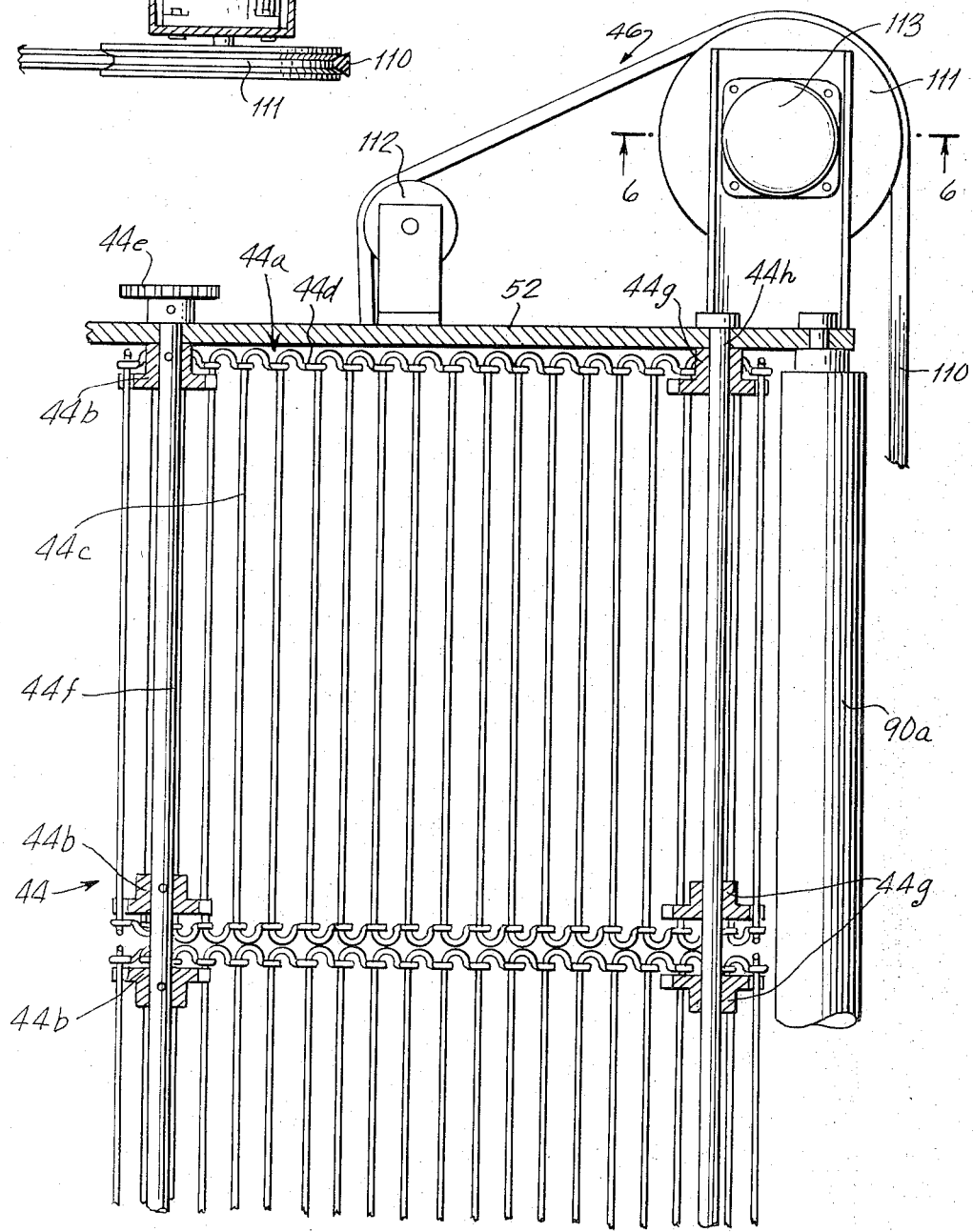

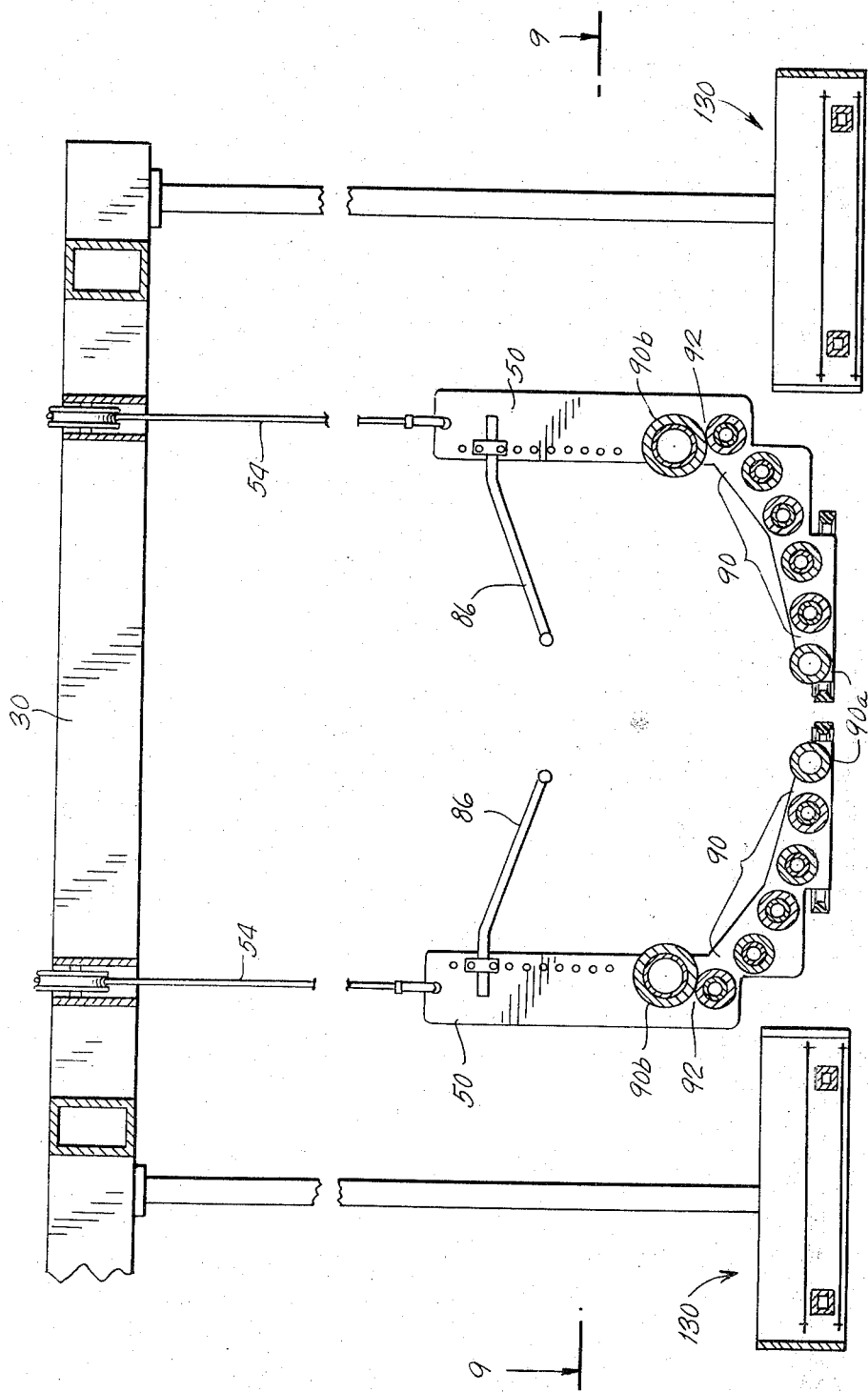

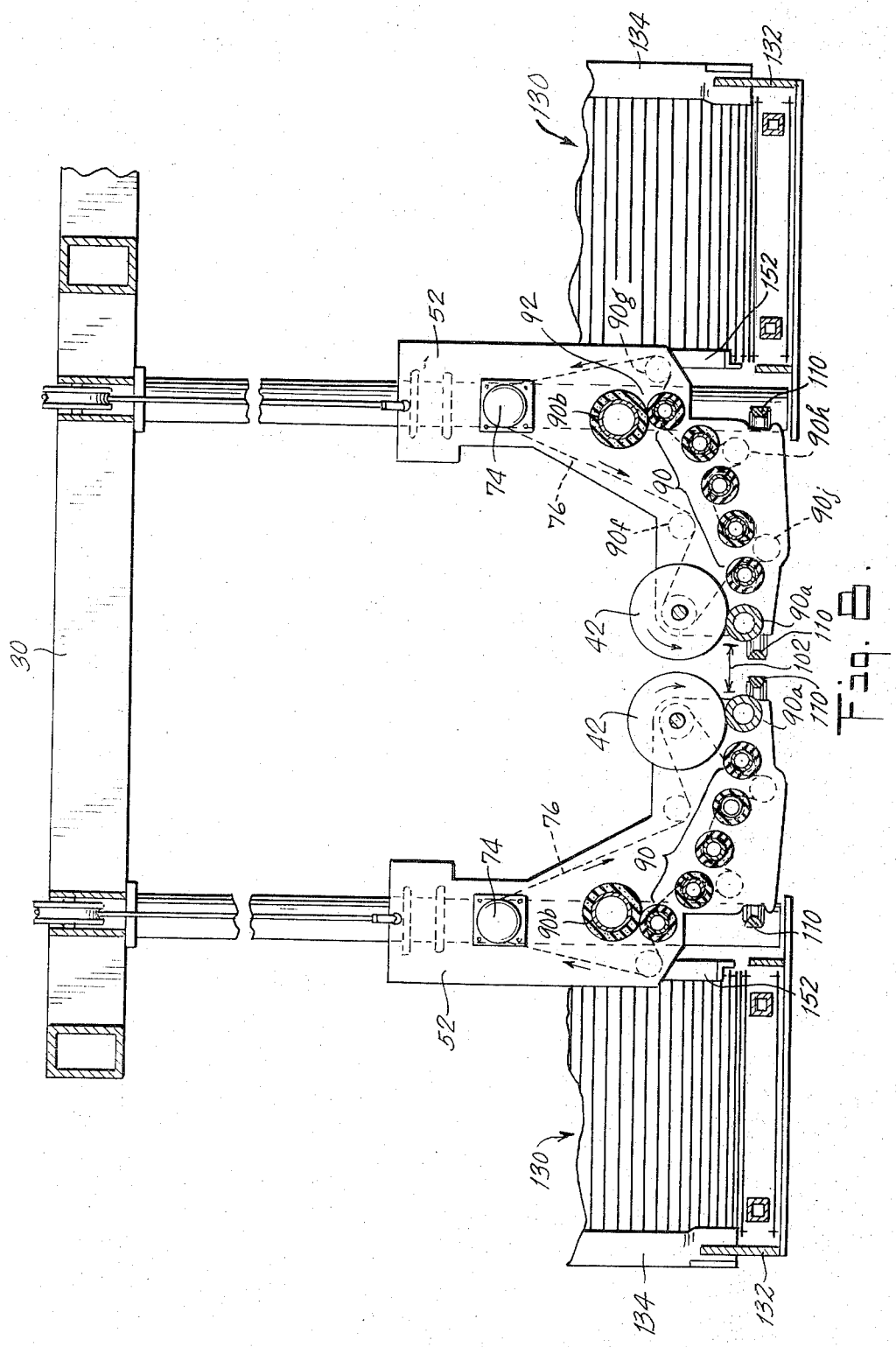

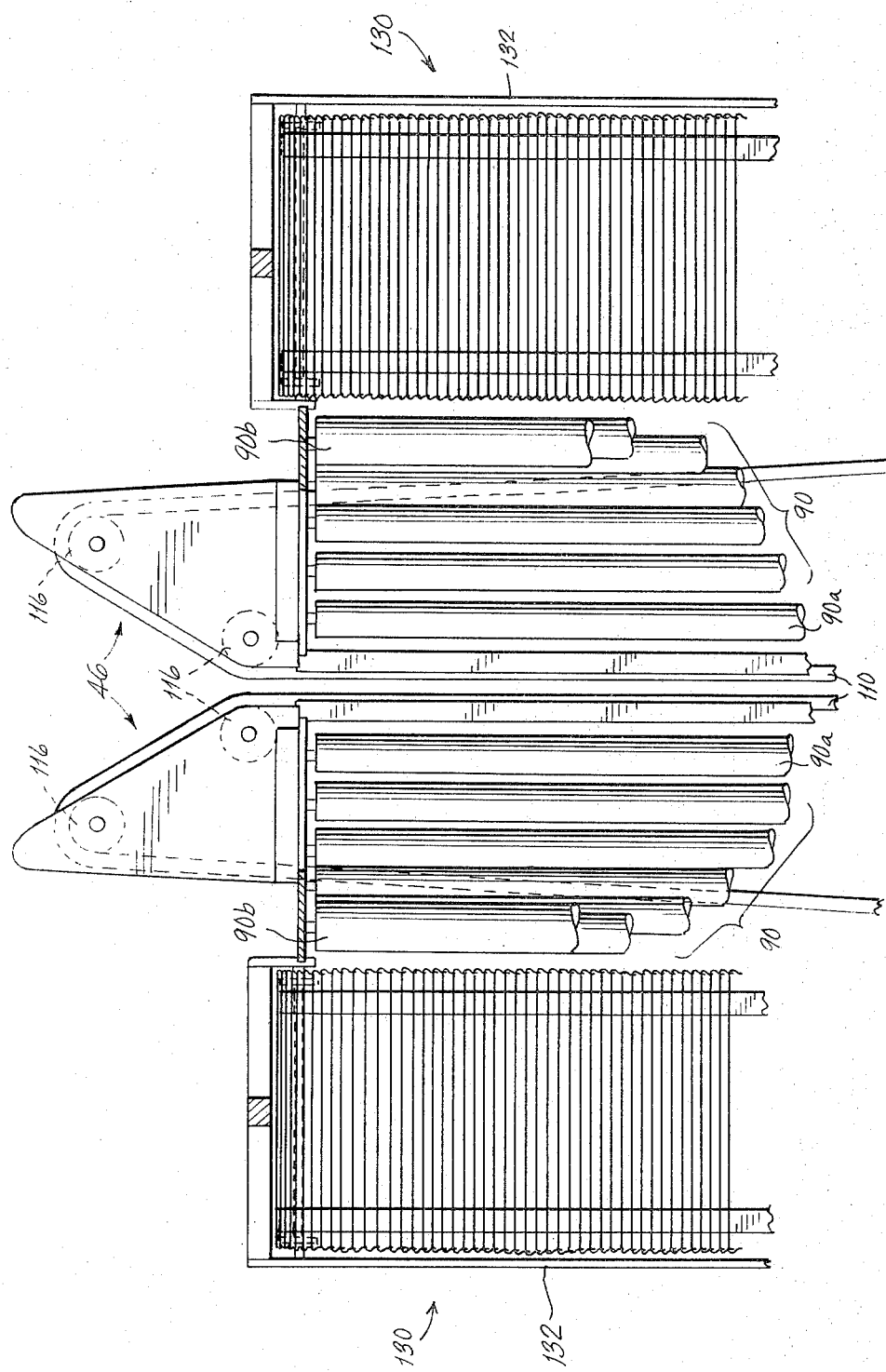

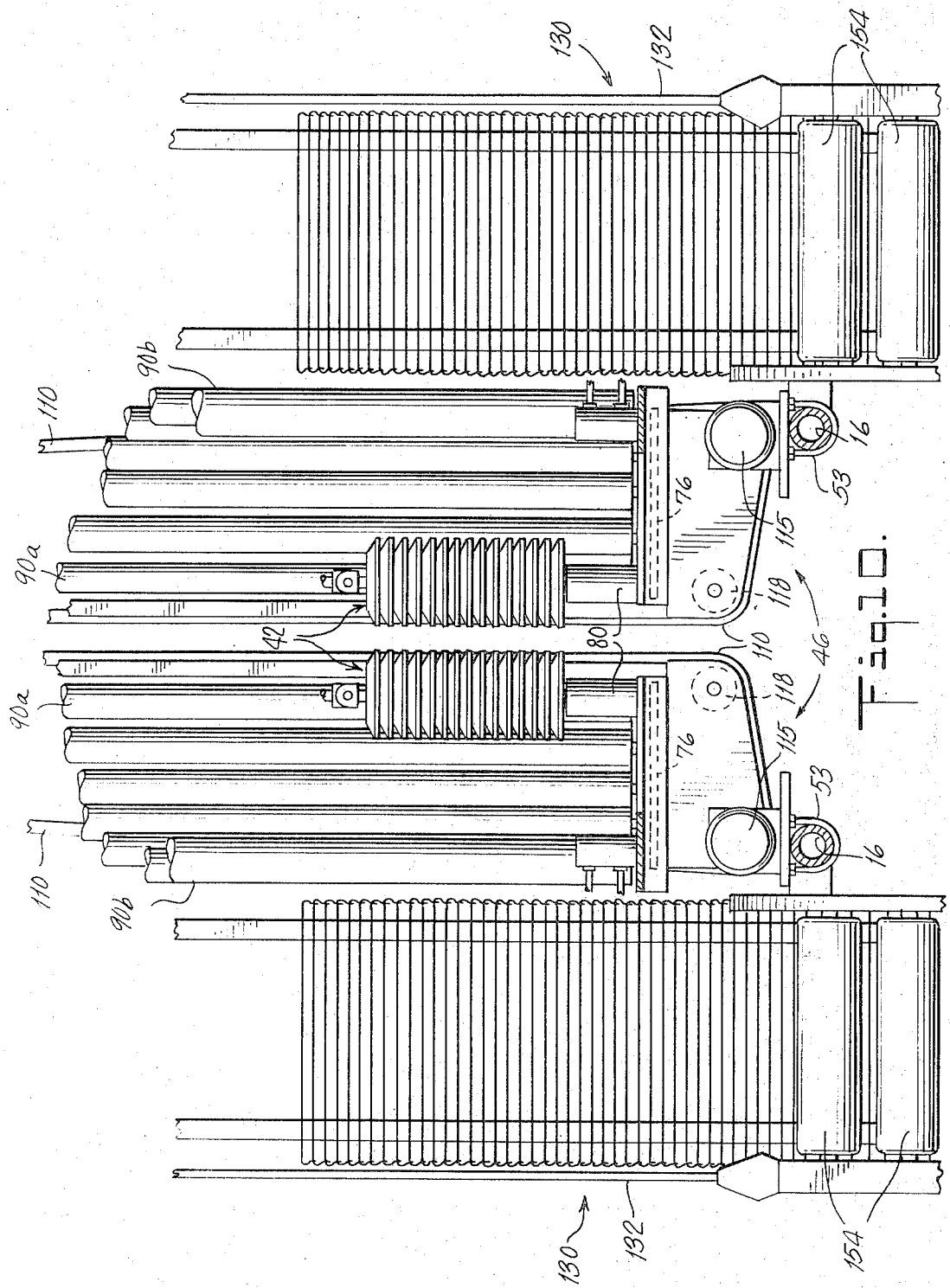

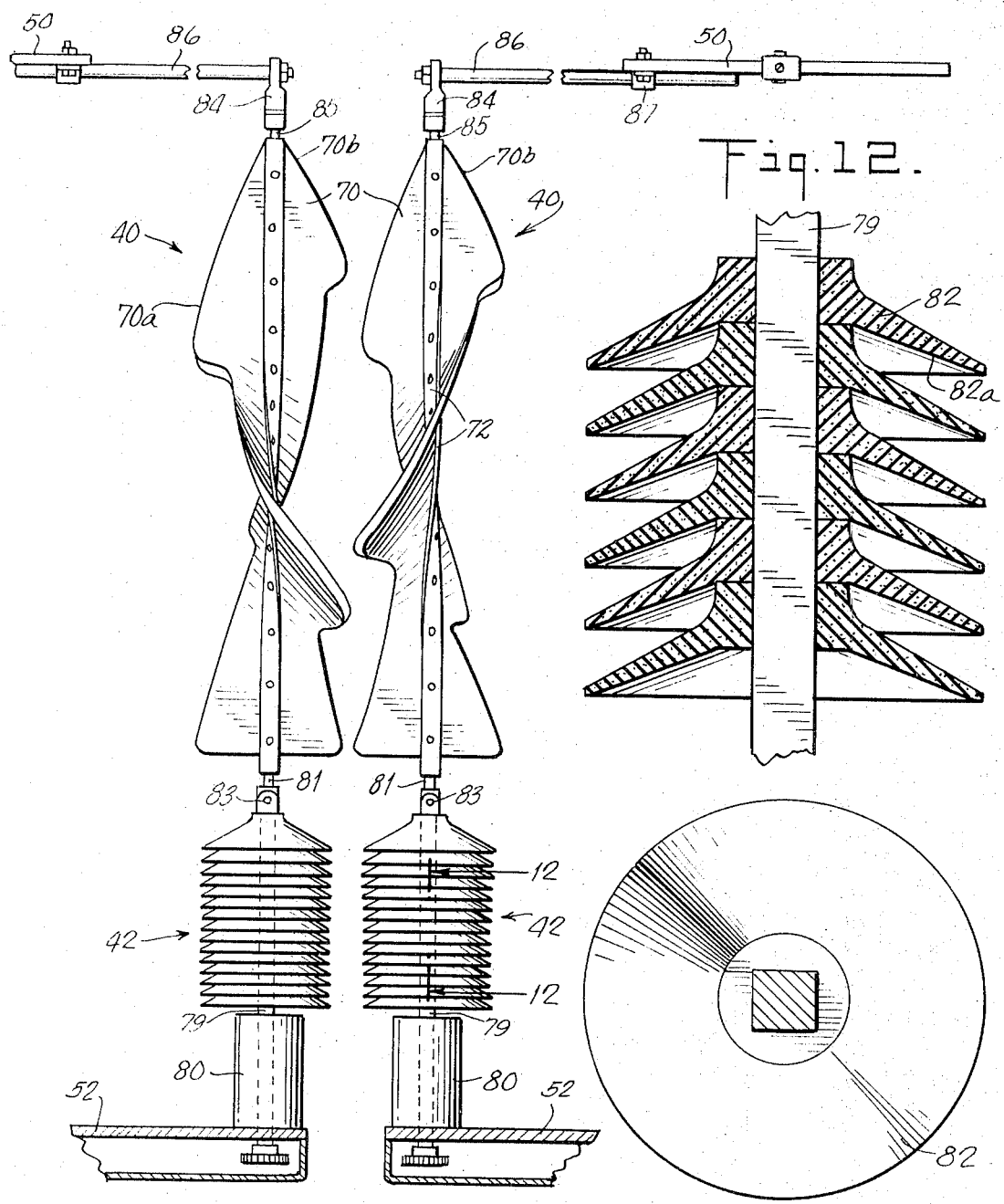

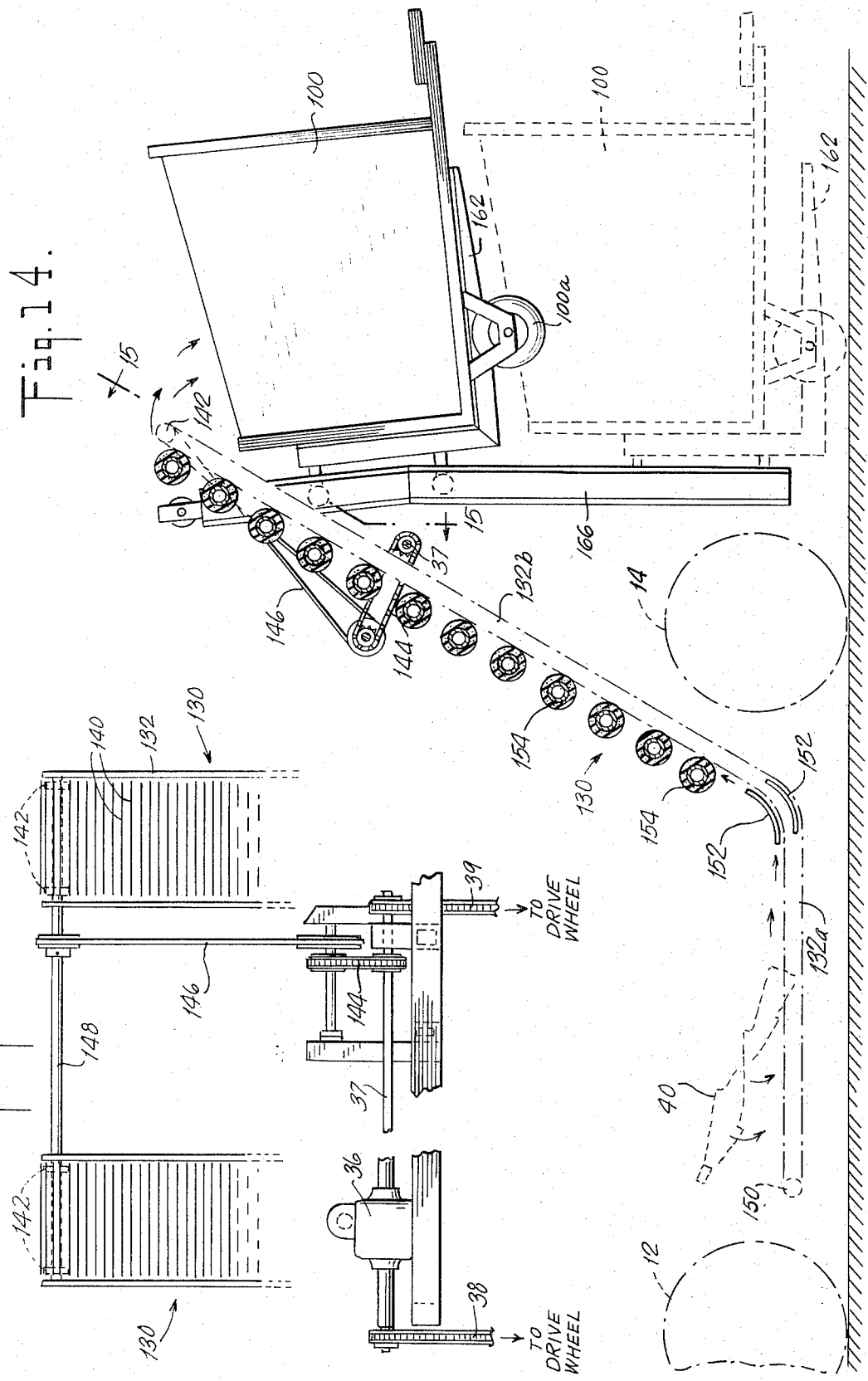

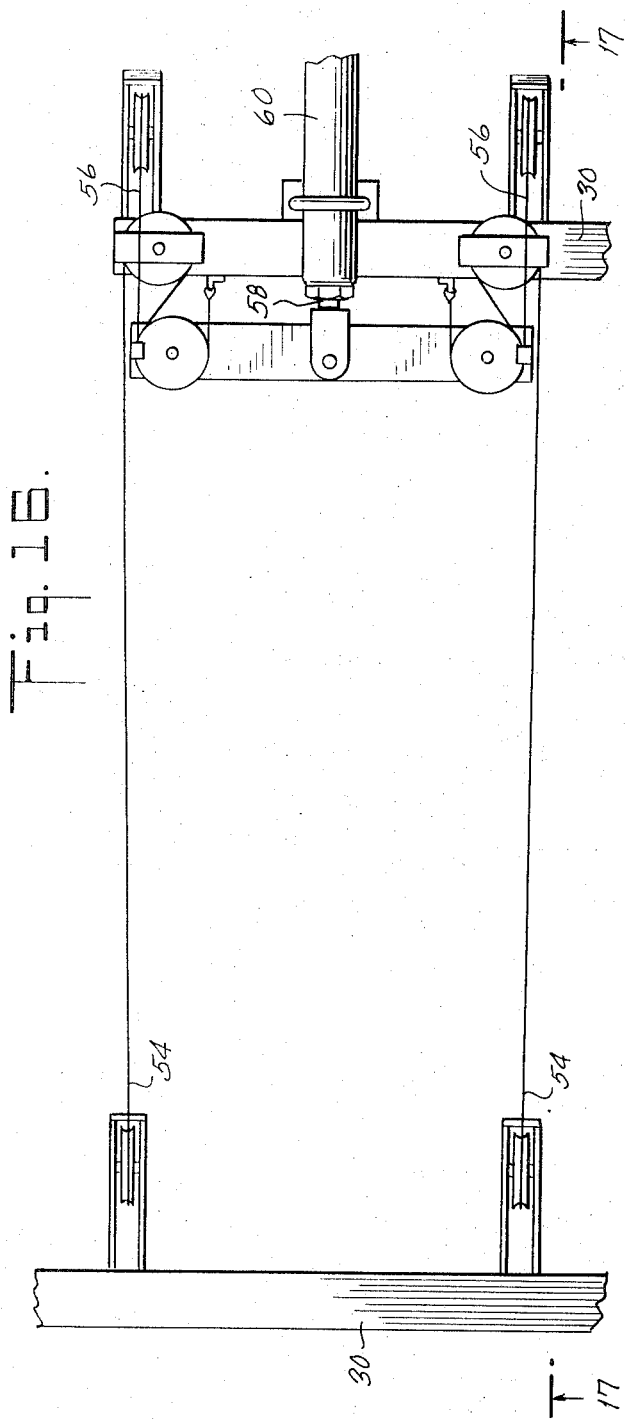
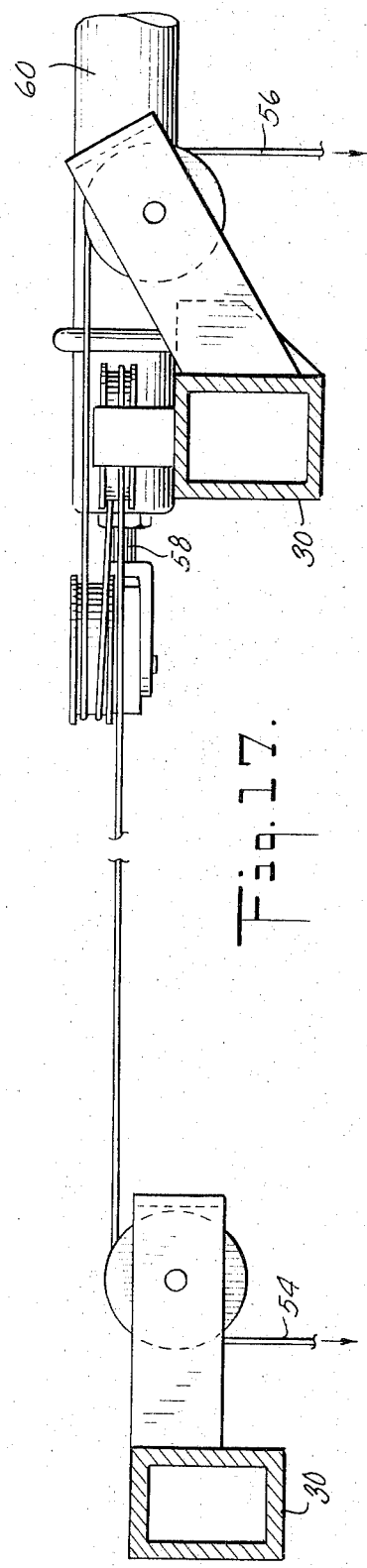
Fig.16.
Fig.17.

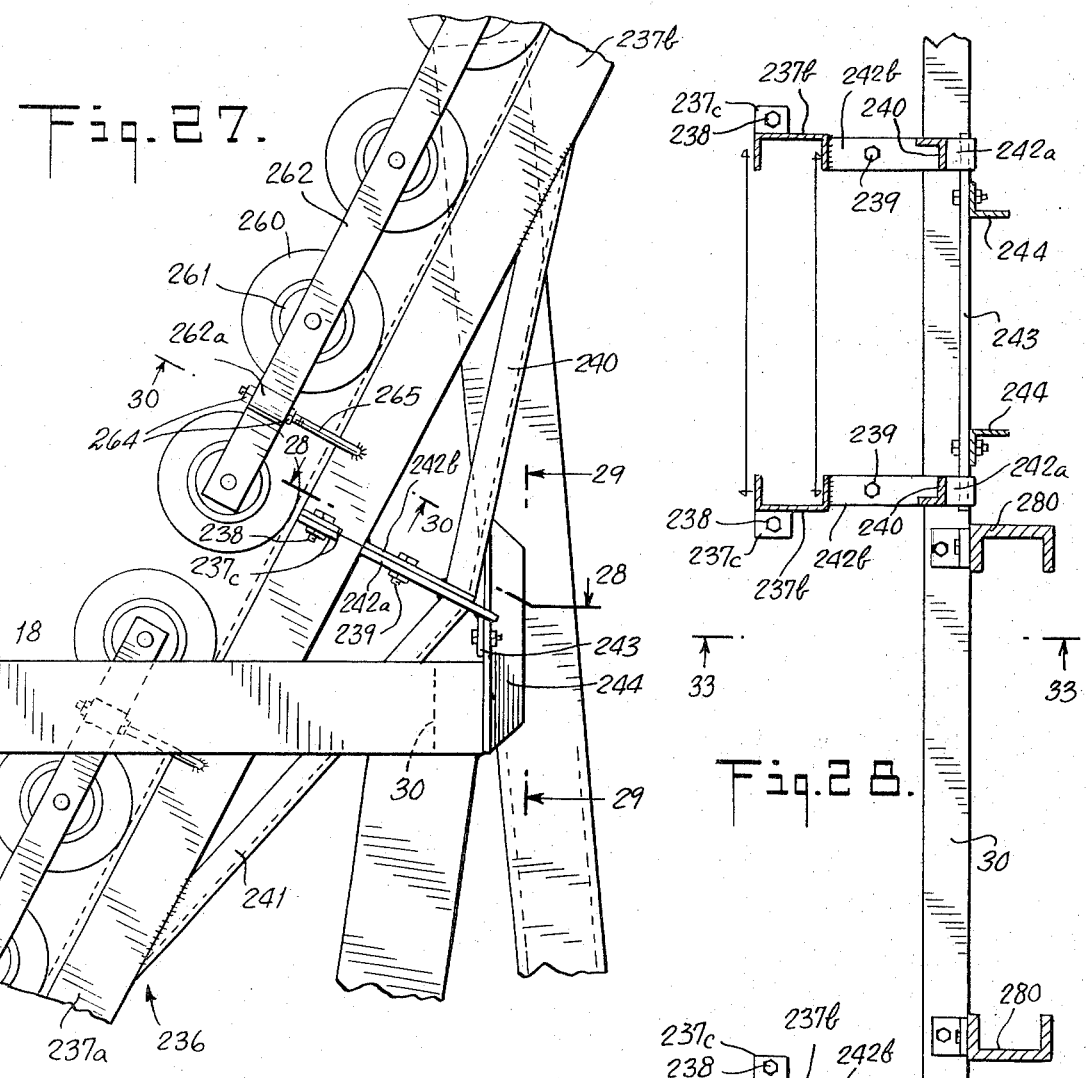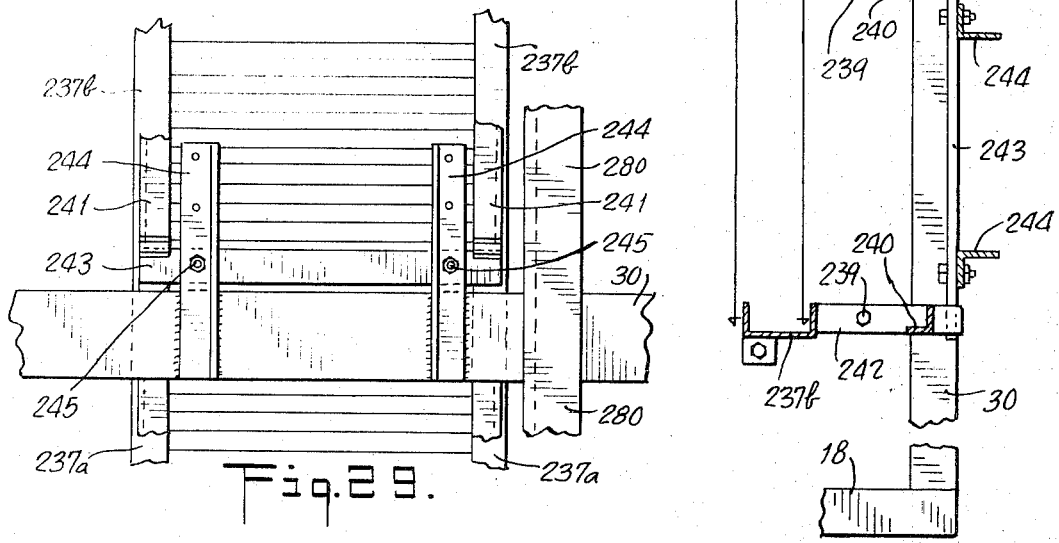

Fig. 30.
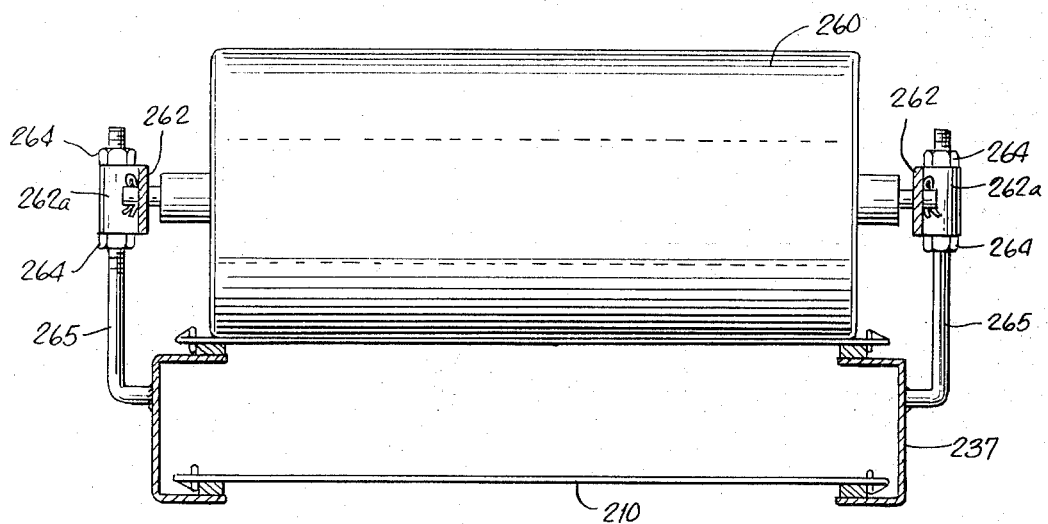
Fig. 31.
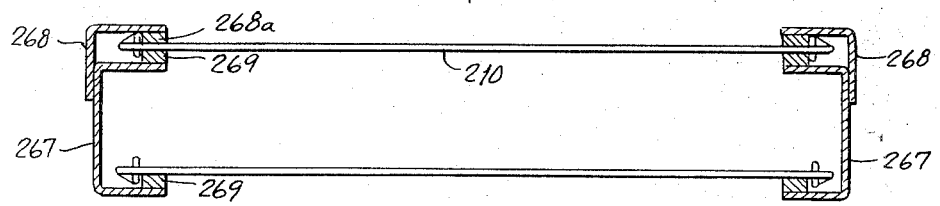
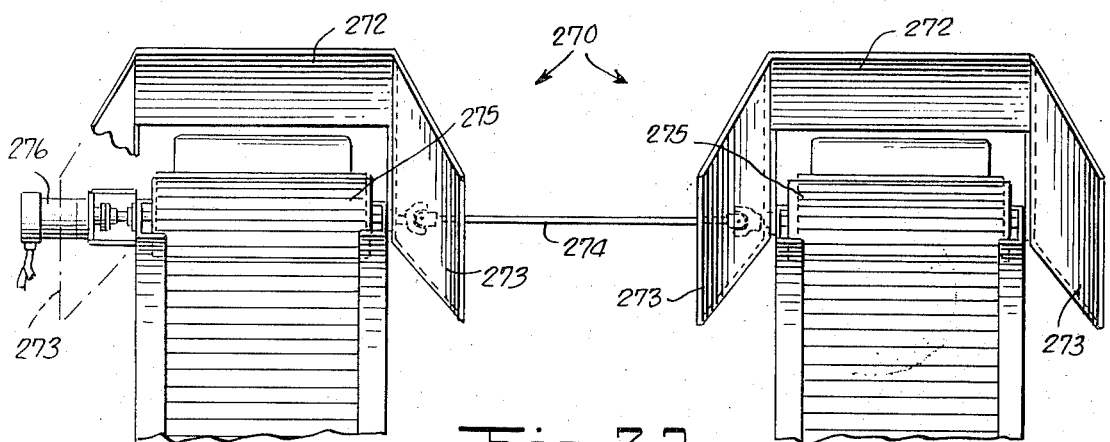
Fig. 32.

TOBACCO HARVESTER

This application is a continuation-in-part of copending application Ser. No. 100,958, now abandoned filed Dec. 23, 1970, by the present inventors, entitled "Improved Tobacco Harvester".

CROSS-REFERENCE TO RELATED APPLICATIONS

This application discloses apparatus which is an improvement on that disclosed in the U.S. Pat. No. to Jesse R. Pinkham, for "Method and Apparatus for Harvesting Tobacco," No. 3,601,959, issued Aug. 31, 1971.

The apparatus includes scavenger discs having rearwardly facing concave surfaces and a knife arrangement for assisting the separation of leaves that are connected to the stalks by fibers.

Each longitudinal conveyor comprises a wire chain conveyor cooperating with one or more rollers above the conveyor and having an outer layer of sponge rubber, said rollers holding the leaves in place on the conveyor.

The leaf receiving receptacle is a trailer which may be hauled by a tractor when it is on the ground, and is raised by a fork lift on the harvester to a leaf receiving position above the tops of the tobacco plants. The trailer is on the back of the harvester and is tilted forward when in the leaf receiving position so that it remains stable during the harvesting operation. The front and rear walls of the trailer are provided with retractable curtains to facilitate unloading of the trailer after it is filled. The trailer is wider than the distance between the outer sides of the two conveyors, so that it can receive tobacco leaves discharged by both conveyors.

BACKGROUND OF THE INVENTION

Tobacco harvesters have been constructed which comprise a vehicle adapted to straddle one or more rows of tobacco plants and carrying, for each row of plants, a pair of defoliators, one located one each side of the row of plants. The defoliators rotate about axes which slant downwardly from the horizontal towards the rear of the vehicle. Each defoliator includes more or less flexible projections, which may be helical, and which engage the leaves of the tobacco plants as the defoliators rotate and strip them downwardly from the stalk. See for example, the U.S. Pats. to Wilson, No. 2,816,411, No. 2,834,173 and No. 3,083,517.

The bottom leaves of a tobacco plant ripen first, and the ripening progresses slowly up the plant, reaching the upper leaves in a period of weeks after the lowest leaves ripen. The harvesting tobacco leaves is therefore a repeated process of "priming" the plants, i.e., harvesting only those leaves which are ripe or "prime" at one time, and then repeating the process about once a week until all the leaves are harvested.

SUMMARY OF THE INVENTION

Similarly to the machine described in Pat. No. 3,601,959, the machine of the present invention includes a defoliating mechanism for stripping leaves from the tobacco stalks, a leaf removal means underneath the defoliating mechanism for carrying the leaves laterally to a conveyor means, which conveys the leaves longitudinally of the vehicle and upwardly to an elevated collection receptacle.

The defoliator mechanism comprises a pair of defoliators located on opposite sides of the row of tobacco plants being harvested. The defoliators are provided with scalloped edges in similar manner to the defoliators described in Pat. No. 3,601,959. However, in order to provide even more efficient defoliator operation, the two defoliators are arranged in a staggered relationship, that is to say, each of the defoliators has its opposite longitudinal edges differently contoured, and in operation the longitudinal edge of one defoliator having one configuration comes up against one side of the tobacco stalk while the opposite side of the stalk is engaged by an edge of the other defoliator having a different configuration.

Associated with each of the defoliators is a group of gleaner, or scavenger discs, which are cup-shaped, so as to obtain the maximum removal of those leaves that may be left behind as a consequence of the normal operation of the defoliating mechanism. Moreover, each group of gleaner discs operates to engage a roller forming part of the leaf removal means, whereby a nip is formed so as to aid in the process of gleaning those few leaves that are left behind. By this arrangement there is minimization of stalk damage in the gleaning operation. A knife is mounted adjacent the defoliator to cut any fibers which may be connecting leaves to the stalks.

One embodiment of the leaf removal means of the present invention is similar to that described in Pat. No. 3,601,959. This leaf removal means comprises two groups of parallel, laterally spaced, longitudinally extending rollers, each group of rollers being located outwardly from the defoliator with which it is adapted to cooperate. In the embodiment disclosed herein, all of the rollers in each group rotate in the same direction but in an opposing direction from the other group of rollers.

The principal embodiment of the leaf removal means comprises two wire chain conveyors which cooperate with the respective defoliators. Once the tobacco leaves have been carried away from the defoliators, each wire chain conveyor passes under a resilient idler roller. Tobacco leaves moving along the conveyor are firmly gripped between the conveyor and the resilient roller, and are positively moved on to a longitudinally moving conveyor means. The longitudinally moving conveyor means comprises essentially two conveyor devices, one on each side of the row of tobacco plants, and each having a horizontal run and an upwardly inclined run such that the leaves are carried to an elevation above the tops of the tobacco plants, whence they drop into a collecting receptacle, also above the tobacco plants. The receptacle is a trailer, which, being normally positioned at a high elevation, does not interfere in any way with the leaf stripping operation. The trailer is capable of holding about 700 pounds of leaves, whereby extensive leaf stripping can be accomplished without the recurring need to stop the vehicle and replace the loaded trailer with an empty one.

The upwardly inclined run of the longitudinal conveyor passes under an array of resilient idler rollers which engage the upper sides of the leaves and hold the leaves in place on the conveyor.

The resilient idler rollers are made with an outer layer of sponge rubber, and each is covered by a canvas sleeve which protects the sponge rubber from deterioration by sunlight.

The operator's seat is located at the front of the vehicle and approximately in the center so that the operator may observe the tobacco stalks as they enter the defoliating mechanism, which is located to the right of the center line of the vehicle. Thus, the defoliating mechanism and the other operative mechanisms are disposed symmetrically about a longitudinal axis which is spaced laterally from the longitudinal axis of the vehicle.

Curtains are provided to guide the tobacco leaves from the laterally moving leaf removal conveyor means on to the longitudinally moving conveyor means.

Mounted on the under sides of the leaf removal conveyors are a pair of ground belts which engage the stalks and guide them between the two conveyors.

When the lowest leaves on the tobacco plants are harvested, the fields are relatively smooth, and the operating parts of the harvester can be lowered to extreme positions without difficulty. As succeeding passes of the harvester are made, the fields become rutted and it is necessary to raise those operating parts to provide greater clearance. For these reasons ground belts for engaging the stalks are demountable to permit a lower setting of the defoliators when they are removed; ground rods substitute for the ground belts when harvesting the lowest leaves; a limit stop is provided for preventing unduly low adjustment of the defoliators; a vertical adjustment for the longitudinal conveyors for various clearance conditions, is independent of the positions of the defoliators and the lateral conveyors; and means for blocking the lateral swing of the defoliators during the lowest pass, which swinging is permitted when harvesting higher leaves.

The trailer may be hauled by a tractor when it is on the ground, and is raised on a fork lift to a leaf receiving position above the tops of the tobacco plants. The trailer is on the back of the harvester and is titled forward when in the leaf receiving position so that it remains stable during the harvesting operation. The front and rear walls of the trailer are provided with retractable curtains to facilitate unloading of the trailers after they are filled. The trailer is wider than the distance between the outer sides of the two longitudinal conveyors, so that it can receive tobacco leaves discharged by both conveyors.

The harvester vehicle comprises a front truck and a rear truck on which the defoliators, the conveyors, the trailer and the driver's seat are mounted. The rear truck is supported principally by two wheels on opposite sides of the truck. The horizontal parts of the frame of the rear truck are above the tops of the tobacco plants, and include a central longitudinal frame member. The front truck is relatively simple, comprising an inverted U-shaped frame supported on two steerable wheels. The central frame member of the rear truck is connected by pivot means to the center of the frame of the front truck. This pivoted truck construction allows the vehicle to travel over rough ground, while keeping all four wheels in contact with the ground, without the use of knee action or other complex supports.

BRIEF DESCRIPTION OF THE DRAWINGS

FIG. 2 is a side elevational view of the apparatus of FIG. 1, with certain parts removed.

FIG. 3 is an enlarged sectional view taken along the line 3—3 of FIG. 2, with certain parts omitted.

FIG. 4 is an enlarged sectional view taken along the line 4—4 of FIG. 2, with certain parts omitted.

FIG. 5 is an enlarged fragmentary sectional view taken along the line 5—5 of FIG. 4.

FIG. 6 is a fragmentary sectional view taken along the line 6—6 of FIG. 5.

FIG. 7 is a sectional view corresponding to FIG. 3, showing an alternative embodiment of the leaf removal means.

FIG. 8 is a sectional view corresponding to FIG. 4, showing an alternative embodiment of the leaf removal means.

FIG. 9 is an enlarged framentary view taken along the line 9—9 of FIG. 7.

FIG. 10 is an enlarged fragmentary view, taken along the line 11—11 of FIG. 2, with certain parts omitted.

FIG. 11 is another enlarged fragmentary view taken along the same line as FIG. 10, showing the complete defoliator mechanism and the associated gleaner discs, together with other related parts of the apparatus.

FIG. 12 is an enlarged sectional view of the scavenger or gleaner disc mechanism.

FIG. 13 is an end view of the scavenger disc mechanism.

FIG. 14 is a vertical sectional fragmentary, somewhat diagrammatic view, taken along the line 14—14 of FIG. 1, certain parts being shown in phantom outline.

FIG. 15 is an enlarged view, taken along the line 15—15 of FIG. 14, showing certain of the parts comprising the longitudinal conveyor means and the driving means for driving the various mechanisms of the apparatus.

FIG. 16 is a plan view, taken along the line 16—16 of FIG. 2, with certain parts omitted, showing the means for raising and lowering the defoliator mechanism.

FIG. 17 is an enlarged view taken along the line 17—17 of FIG. 16.

FIG. 22a is an enlarged fragmentary view corresponding to a portion of FIG. 19.

FIG. 27 is an enlarged view showing the support of one of the longitudinal conveyors at the rear end of the harvester of FIG. 19.

FIG. 28 is a cross-sectional view taken on the line 28—28 of FIG. 27.

FIG. 29 is a cross-sectional view taken on the line 29—29 of FIG. 27.

FIG. 30 is a cross-sectional view taken on the line 30—30 of FIG. 27.

FIG. 31 is a cross-sectional view taken on the line 31—31 of FIG. 19.

FIG. 32 is a fragmentary rear elevational view taken on the line 32—32 of FIG. 19.

DETAILED DESCRIPTION

FIGS. 1, 2, 35 and 36

Figure 35:
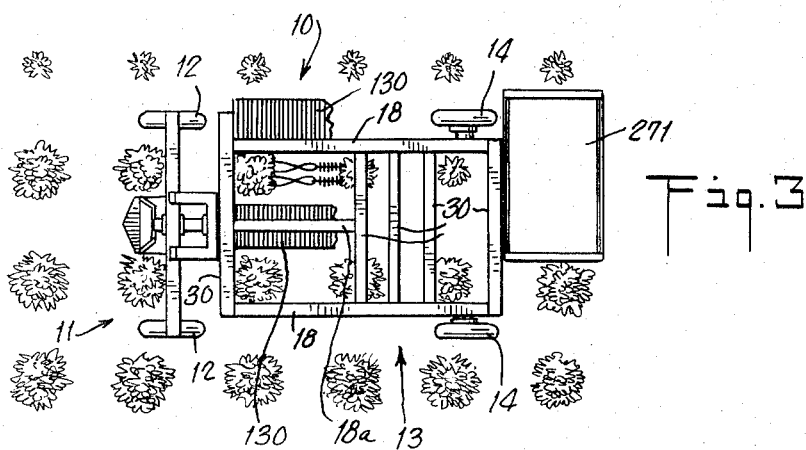
FIG. 35 is a plan view, on a reduced scale, showing a harvester of the invention moving through a tobacco field.

These figures illustrate generally a vehicle 10, carrying tobacco-harvesting apparatus constructed in accordance with the present invention. As best seen in FIG. 35, the vehicle is adapted to straddle two rows of tobacco plants and to harvest the leaves on one of the two straddled rows. The vehicle has a front truck 11 supported by a pair of front wheels 12 and a rear truck 13 supported by a pair of rear wheels 14.

The front truck 11 includes a transverse frame member 15 located at the top of the truck and a pair of vertical legs 120 in the form of vertical shafts journaled in the ends of the frame member 15. The wheels 12 are rotatable on stub shafts 17 mounted in brackets 29 fixed on the lower ends of the legs 120. Attached to the rear side of the frame member 15 at its center is a rearwardly extending rectangular frame including two frame members 19 extending longitudinally of the harvester and a transverse frame member 21 connecting the ends of the frame members 19.

The rear truck 13 comprises a frame at the top of the harvester, including two longitudinal side frame members 18 and a plurality of transverse frame members 30 connecting the side frame members. A central longitudinal frame member 18a is attached to the two most forwardly located transverse frame members 30. Attached to each side frame member 18 near the back end thereof is a leg comprising two downwardly extending diagonal frame members 22, which converge toward their lower ends. The lower ends of the members 22 are connected by short frame members 23. The rear wheels 14 are journaled on stub shafts in the frame members 23.

Figure 36:
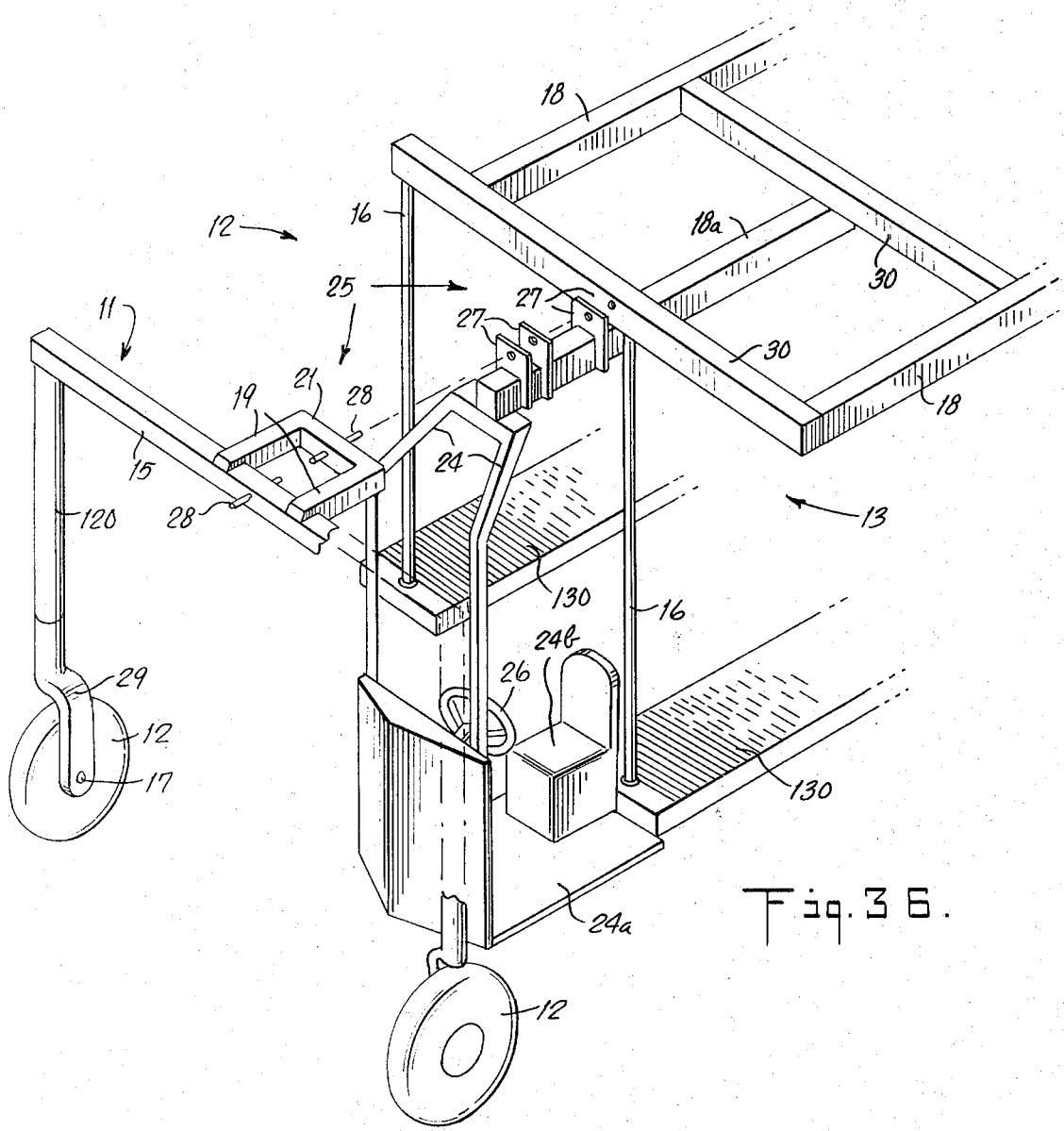
FIG. 36 is an exploded perspective view showing details of the pivot means connecting the front and rear trucks of the harvester vehicle.

The front truck 11 and rear truck 13 are connected by pivot means generally indicated at 25, and best seen in exploded view in FIG. 36. The central frame member 18a projects forwardly beyond the front transverse frame member 30 of the rear truck. The projecting portion of the frame member 18a carries two pairs of spaced guides 27 extending at right angles to the frame member 18a. As shown in FIG. 36, one side of the front frame member 30 may serve as one of the guides. Two axially spaced, aligned pivot pins 28 extend respectively through the frame members 15 and 21 of the front truck and each pin 28 also extends through one pair of spaced guides 27 of the rear truck.

The pivot means 25 allows the front and rear trucks to assume different angular positions with respect to the pivot axis. Consequently, the vehicle is very adaptable to traveling over rough ground. The rear truck, which supports all of the principal operating parts of the harvester, assumes an angular position with respect to the pivot axis, as determined by the positions of the rear wheels 14. Its angular position is not disturbed by the positions of the front wheels 12.

The horizontally extending frame members of both the front and rear trucks are located high on the harvester, above the level of the tops of mature tobacco plants. Consequently, the harvester can straddle one or two rows of plants, as best shown in FIG. 35.

The operating parts of the harvester include a pair of defoliators 40 (FIG. 1), a pair of lateral conveyors or leaf removal means 44 and a pair of stalk aligning belts 46, hereinafter sometimes referred to as ground belts. These three pairs of operating parts are all supported on a pair of carriages 41, which are in turn supported from the frame members 18 and 30 of the rear truck. The carriages 41 and the operating parts supported thereby are symmetrically located with respect to a longitudinal axis which is spaced to the right of the center line of the harvester. (See FIGS. 1 and 35).

The projecting front end of the central beam member 18a also supports a downwardly extending, inverted U-shaped frame 24, supporting a platform 24a on which rests a driver's seat 24b, and a steering wheel 26 which controls the front wheels 12 through suitable hydraulic steering mechanism, (not completely shown) which may include a double acting cylinder 123 (FIG. 1) operating a piston rod 124 connected through suitable linkage to control arms 126, which are fixed on the legs 120. Other controls (not shown) for the various units of the harvester are within reach of an operator on the seat 24.

The rear truck also carries a pair of longitudinal conveyors 130 which deliver tobacco leaves received from the lateral conveyors 44 and carry them to a leaf receiving receptacle 100 illustrated in FIG. 14 as a trailer 100. Each conveyor 130 is supported by two uprights 16 which are attached at their upper ends to frame members 30, and by a suitable fixed connection (not shown) between the frame of the conveyor and the frame of the vehicle, at their rear ends. The lower ends of the pair of uprights supporting one conveyor are connected by a beam 20, which may also be connected to platform 24a, as shown in FIG. 2.

An engine 32 is mounted on two of the transverse frame members 30 and is coupled by way of a suitable transmission generally indicated at 34, a differential 36, and a transverse axle 37 to a pair of chains 38 which drive sprocket wheels 39 fixed on shafts carrying the rear wheels 14. It will be understood, of course, that rather than having the wheels directly connected to the engine 32, a hydraulic drive means may be employed for driving the wheels, as well as for driving other devices of the apparatus.

Each carriage 41 includes a front frame member 50 and a rear frame member 52. The rear frame members 52 are guided in their vertical movement by means of yokes 53 which surround the rear uprights 16 (see FIG. 10). The frame members 52 and yokes 53 are free to pivot about the uprights 16. The front frame members 50 are lifted by cables 54 without any guide means being provided. The front frame members 50 are therefore free to swing laterally as required to accommodate the positions of the tobacco stalks. The frame members 50 and 52 are supported by cables 54 and 56 which run over suitable pulleys (see FIG. 16) which, in turn are connected to a piston rod 58, driven by a hydraulic cylinder 60 or other suitable controllable reciprocating means. The cylinder 60 may be actuated by the operator of the vehicle so as to raise or lower both ends of both the carriages 41 simultaneously, thereby raising and lowering both of the defoliators 40, both the gleaners 42, both the leaf removal means 44 and both the stalks aligning means 46.

DEFOLIATOR MECHANISM

Figure 1:
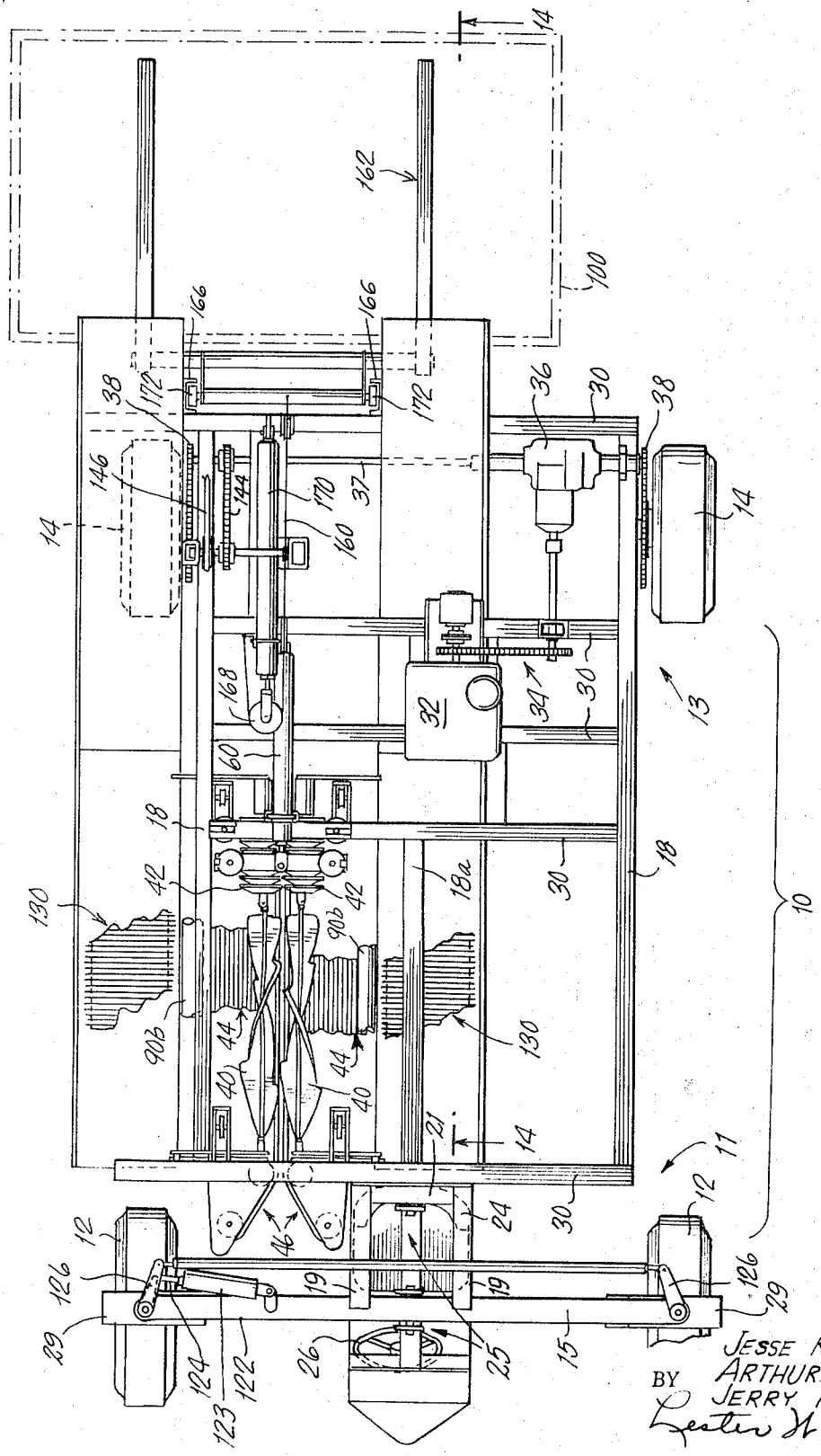
FIG. 1 is a top plan view, partly diagrammatic, showing a tobacco harvesting apparatus, in accordance with one embodiment of the present invention.

FIGS. 1, 2 and 11

The defoliators 40 define between them a plant passageway. In each of the defoliators 40 forming the defoliator mechanism (see FIG. 11), a web 70, having scalloped edges 70a and 70b, is held within a helical twisted shaft 72, so that the web itself retains a helical twist. The scalloped edges 70a and 70b have a radius, with reference to the axis of the defoliator, which varies cyclically along the longitudinal dimension of that axis. It is desirable to use rubber of 40 Durometer for the web, although other materials of suitable flexibility may be employed.

As shown in FIG. 11, the defoliators 40 are arranged with their scalloped edges in a staggered relationship. The scallops on the opposite edges 70a and 70b are out of phase. Thus, as seen in FIG. 11, each edge is formed with a radius gradually increasing from the front toward the rear, followed by an abrupt decrease. The points of maximum radii and the abrupt decreases on the edges 70b are spaced axially ahead of the decreases in radius of the edges 70a. Consequently, when the defoliators are operating to engage a tobacco plant, a longitudinal edge on one defoliator characterized by an abruptly increasing radius engages the plant stalk opposite a longitudinal edge on the other defoliator exhibiting a gradually increasing radius. In other words, when a projecting scallop engages one side of a stalk, its opposite side is in a recess between scallops on the web of the other defoliator. It has been found that with such a staggered configuration for the scalloped edges, there is substantially less damage to the tobacco stalks.

The defoliators 40 are driven by means of hydraulic motors 74 (see FIG. 4). The motors 74 are coupled by a sprocket chain arrangement, generally indicated at 76, so as to drive the gleaners 42 and the leaf removal means 44. These motors are controlled by suitable means, not shown, in order that the operator may control the speed of movement of the defoliators, the gleaners 42 and the leaf removal means 44.

Each gleaner 42 (FIG. 12) is carried on a square shaft 79 extending through a spacer sleeve 80 (FIG. 11) and each comprises a stack of sponge rubber discs 82 which are generally cup-shaped, with their inner concave surfaces 82a facing rearwardly of the vehicle. It has been found that this unique configuration for the gleaner discs aids significantly in the gleaning or scavenging operation. This scavenging operation is made necessary by the fact that when the defoliators 40 engage the tobacco leaves, they act to break the leaves from the stalks. However, the webs of the defoliators, being relatively hard and smooth-surfaced, slip readily over the surfaces of the tobacco stalks and leaves, and may allow some leaves to remain connected by a fibrous part of the leaf stem to the stalk.

It had also been found that improved scavenging is accomplished by having the gleaners 42 cooperate with an idler roller 90a, preferably of steel, and located under the gleaners so as to form a nip, thereby nipping or pinching any remaining leaves from the stalk. It will thus be appreciated that an efficacious clinging grip is promoted by reason of the fact that the gleaner discs 82 are of the configuration illustrated, and at the same time because of their cooperation with the rollers 90a the remaining leaves are efficiently removed from the stalks with minimal bruising of the stalks. The orientation illustrated for the gleaners, with their concave surfaces to the rear, facilitates bending of the gleaner discs as may be required to pass some leaning stalks without damaging them.

The forward end of each shaft 79 is connected through a universal joint 83 to a stub shaft 81, whose forward end is in turn connected to a twisted shaft 72 of a defoliator 40. The forward end of each shaft 72 is connected to another stub shaft 85, which is journaled in a bearing 84 affixed to a support arm 86, which in turn is rigidly secured to frame member 50 by a suitable clamp 87 (FIG. 3). The elevation of the support arm 86 can be altered so as to change the tilt angle of the defoliators 40 and thereby change the vertical dimension of the swath along the tobacco stalks which is harvested by the machine during a pass along a row of stalks.

LEAF REMOVAL MEANS

FIGS. 3-5

The leaf removal means 44 collects the tobacco leaves after they have been stripped from the stalks by the defoliators 40 or gleaned by the gleaners 42. As best seen in FIGS. 4 and 5, the leaf removal means 44 comprises a pair of wire chain conveyors 44a located on opposite sides of a row of tobacco plants and inclined upwardly in a lateral direction away from the row of plants. Also included in the leaf removal means is a pair of idler rollers 90a which form nips with the respective gleaners 42, and are frictionally driven thereby. Rollers 90a cooperate with the gleaners to catch and carry away leaves separated from the stalks by the gleaners. At the upper ends of the runs of the conveyors 44a, relatively large diameter sponge rubber covered rollers 90b are located above the wire chain conveyors. Each roller 90b may be adjusted so that it is either in a light frictional contact with its associated conveyor, or it may be spaced therefrom by a distance up to about one-quarter inch. If there is frictional contact, then the roller turns continuously when the conveyor is running. If there is a spacing, then the roller is driven only when a tobacco leaf is passing between the roller and the conveyor. After traveling upwardly along a wire chain conveyor 44a, the tobacco leaves are engaged between that conveyor and a roller 90b, and are positively driven from the leaf removal means.

The term "sponge rubber," as used in this specification, is intended as a generic term, inclusive of equivalent soft, yieldable materials which can frictionally grip a tobacco leaf without damaging it. The particular material presently preferred to cover the rollers 90b is polyurethane foam.

As can best be seen in FIG. 5, each of the wire chain conveyors 44a comprises a series of integral links, each consisting of a straight bar portion 44c, and end portions 44d bent forward toward the preceding link and terminating in loops which encircle that preceding link near the ends of its straight bar portion. Preferably the wire chain conveyor is formed in four parallel sections with the wire bars extending longitudinally of the vehicle, two of which sections are seen in FIG. 5. Each section of conveyor 44a runs over sprockets 44b fixed on a drive shaft 44f and also over sprockets 44g on an idler shaft 44h. Power to drive the wire chain conveyors is applied to sprockets 44e on the drive shaft 44f, through the sprocket chain arrangements 76, which include suitable idler rollers 76a, 76b and 76c (FIG. 4).

It has been found that the wire chain conveyors illustrated are superior to other types of conveyors for handling tobacco leaves. Since the conveyor moves along with the leaves, there is no opportunity for leaves to fall between the conveyor elements, as in the case of the rollers of FIGS. 7–10, described below. Furthermore, the open spaces between the links of the chain conveyors allow dust, dirt and other materials of relatively small dimensions to fall through, so that such materials are not carried along to the receiving receptacle.

FIGS. 7–10

An alternative embodiment for the leaf removal means is shown in FIGS. 7–10, in which groups of conveyor rollers 90 take the place of the wire chain conveyors 44a for the same essential purposes. Associated with the groups of rollers 90 are the inboard rollers 90a for cooperative engagement with the gleaners 42, as already seen in FIG. 4. Likewise, the uppermost roller 90b, as seen in FIG. 7, is similar to its counterpart 90b in FIG. 4. Suitable guide rollers 90f, 90g, 90h and 90j (FIG. 8) are provided to effect proper driving of the active components. The outermost pair of rollers 90 cooperate with the large sponge rubber covered rollers 90b to form nips as indicated at 92 and it is from these nips that the leaves exit from the leaf removal means to conveyors 130, described below, by which the leaves are carried to the collecting receptacle.

The two inboard rollers, that is rollers 90a, define between them a central gap, identified by the reference numeral 102 in FIG. 8, through which the stalks of the tobacco plants pass as the vehicle moves along a row.

As noted previously in connection with the description of the gleaner mechanism, the gleaners 42 form nips with the rollers 90a so as to aid in the scavenging operation. The gleaners are driven by the drive chain 76 and frictionally and compressively engage the inboard rollers 90a and thereby rotate those rollers. Rollers 90a are not otherwise driven.

It will be seen by reference to FIG. 8 that the driven rollers of the leaf removal means which are located on one side of a row of stalks are driven oppositely from those on the opposite side. Thus the group of rollers 90 appearing at the right turns in a clockwise direction, whereas the group at the left turns counterclockwise.

STALK ALIGNING MEANS

FIGS. 5–10

The stalk aligning means 46 (FIGS. 1, 5, 9 and 10), positions the stalks of leaning or otherwise misaligned tobacco plants so that the leaves may be readily stripped therefrom; it also supports such stalks laterally during the stripping operation. This means comprises two endless bands 110 disposed on opposite sides of a row of tobacco plants and located slightly below the leaf removal means. In the species of FIGS. 7–10, the forward ends of the bands pass over suitable pulleys 116, shown in FIG. 9, and the rear end thereof pass over idler pulleys 118 and drive pulleys (not shown) driven by hydraulic motors 115. In the species of FIGS. 3–6, the rear ends of the bands 110 pass over drive pulleys 111 and idler pulleys 112. The drive pulleys are operated by hydraulic motors 113. The bands 110 move along an inner positioning reach and an outer return reach, the inner reach being parallel to the row of stalks.

As seen in FIG. 9, after leaving the return reach the bands 110 pass along a diagonal entrance reach, where they are effective to engage misaligned stalks and guide them to an upright position. The two pairs of forward idler pulleys 116 cooperate to define the entrance reaches of the endless bands 110 so that the endless bands gradually enter into contact with the stalks, whereby the stalks do not abruptly encounter the bands. It should be noted that the term "band" is intended to be a generic term encompassing both belts and roller chains of various types.

The endless bands 110 are driven at a linear speed substantially equal to the forward speed of the vehicle 10. This is accomplished in the present machine by having the endless bands 110 driven by their motors at a speed which is substantially equal to the forward speed of the vehicle. In this way, the speed of the bands with respect to the ground is substantially zero, as that the bands engage and position a misaligned stalk very gently, without substantial impact, and without any friction between the band and the stalk.

LONGITUDINAL CONVEYORS

FIGS. 3, 4, 7–10, 14–15

Two longitudinal conveyors 130 are provided on opposite sides of a row of tobacco plants. The conveyors extend longitudinally of the vehicle and are disposed laterally outwardly beyond the leaf removal means 44. Each conveyor includes a horizontal run 132a (FIG. 14) extending along the length of the leaf removal means and an upwardly inclined run 132b which terminates at a point just above the collecting receptacle 100 in its elevated position. The horizontal run is enclosed within a frame 132 and the upwardly inclined run is enclosed within a frame 134.

The longitudinal conveyors 130 are similar in construction to the conveyors 44a, described above in connection with FIGS. 3–5. Each conveyor 130 comprises a series of parallel spaced bars 140 which are linked together at their ends. The conveyor mechanism is driven by sprockets 142 at the top of the inclined run. The sprockets 142 are driven by the engine 32 (FIG. 1) through the transmission 34, differential 36, shaft 37, a chain 144 and a belt 146 so as to drive a shaft 148 (FIG. 15) upon which the sprockets 142 are mounted. Guide rollers 150 are provided at the lower (forward) ends of the conveyors. Curved guides 152 are provided at the point of transition from the horizontal run 132a to the inclined run 132b so as to aid in guiding the conveyor bars between the two runs.

In the operation of the conveyor 130, the tobacco leaves are moved upwardly and are retained along the inclined run by a series of large (approximately 8 inch diameter) sponge rubber covered idler rollers 154 which are disposed above the conveyor bars.

The elevation of the collecting receptacle 100 is controlled by means of a cable 160 (FIG. 1) which is connected to fork lift mechanism 162, the cable being carried over a pulley 164 (FIG. 2) at the top of a vertical frame member 166. The cable 160 extends along the top of the vehicle and around pulley 168. In operation, a hydraulic motor 170 is actuated by the operator to produce linear movement of pulley 168 whereby the cable 160 acts to lift the fork lift mechanism 162 which is provided with upper and lower rollers 172 disposed within channel members 166. The upper ends of the channel members 166 are tilted forward to ensure that the trailer 100 is stably supported when in its upper position. This allows the harvester to travel over uneven ground without danger of dislodging the trailer.

After a harvest of tobacco leaves has been obtained and has been placed in the collecting receptacle 100, the receptacle, which is in the form of a trailer having four sides and provided with wheels 100a, is lowered to the ground by actuation of fork lift mechanism 162. The trailer can accommodate a large load of the order of 700 pounds of tobacco leaves. This means that the vehicle can be utilized to harvest about 1,800 feet of tobacco rows before the operation must stop so that the trailer can be replaced with an empty one.

LEAF RETAINING MECHANISM

FIG. 18

Figure 18:
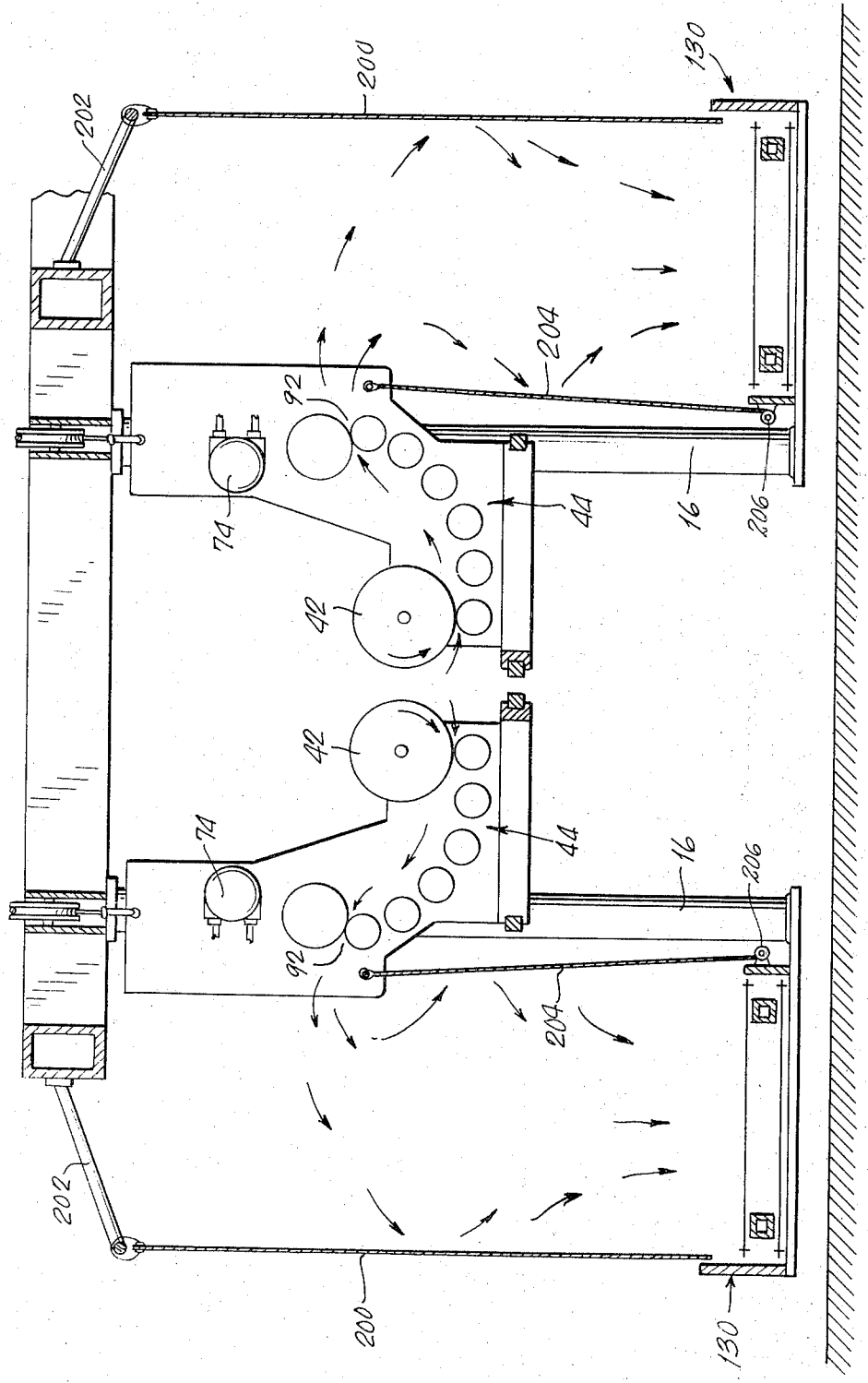
FIG. 18 is an elevational view, illustrating an elevated positioning of the defoliator mechanism, and the use of side curtains on the vehicle in connection with the defoliator mechanism.

In order to insure that the leaves will be properly conveyed from the leaf removal mechanism 44 onto the conveyors 130, a side curtain 200 extends above the outer side of the conveyor 130. The curtain 200 is suspended from an arm 202 projecting outwardly from the main frame. Another curtain 204 is provided above the inner side of the conveyor 130. One end of each curtain 204 is wound on a roller 206, fastened to a conveyor 130, and the other end is attached to a carriage 41, when the carriage 41 is lifted to an elevated position, the curtain 204 is unwound to the position shown in FIG. 18.

Because of the arrangement of the curtains, the tobacco leaves as they exit from the nip 92 will not, despite the fact that they have acquired substantial velocity, be projected outwardly beyond the conveyors, nor inwardly, because of the presence of the curtains 202 and 204.

FIGS. 19-34

These figures illustrate another modification of the invention. This modification includes certain features not present in the previous modifications. Some of those features are directed to structural arrangements which facilitate lowering of the defoliators and the longitudinal conveyors to a lower limiting position to facilitate harvesting the very lowest leaves on the tobacco plants. There are also improvements in the scavenging apparatus, particularly including a knife for cutting fibers attaching the leaves to the stems, improvements in the lateral and longitudinal conveyor structures, particularly fabric sleeves over the sponge rubber covered rollers; improvements in the fork lift mechanism; and improvements in the trailer structure.

Those elements in this embodiment which correspond in structure and function to their counterparts in the previous embodiments are given the same reference numerals and are not further described.

Figure 20:
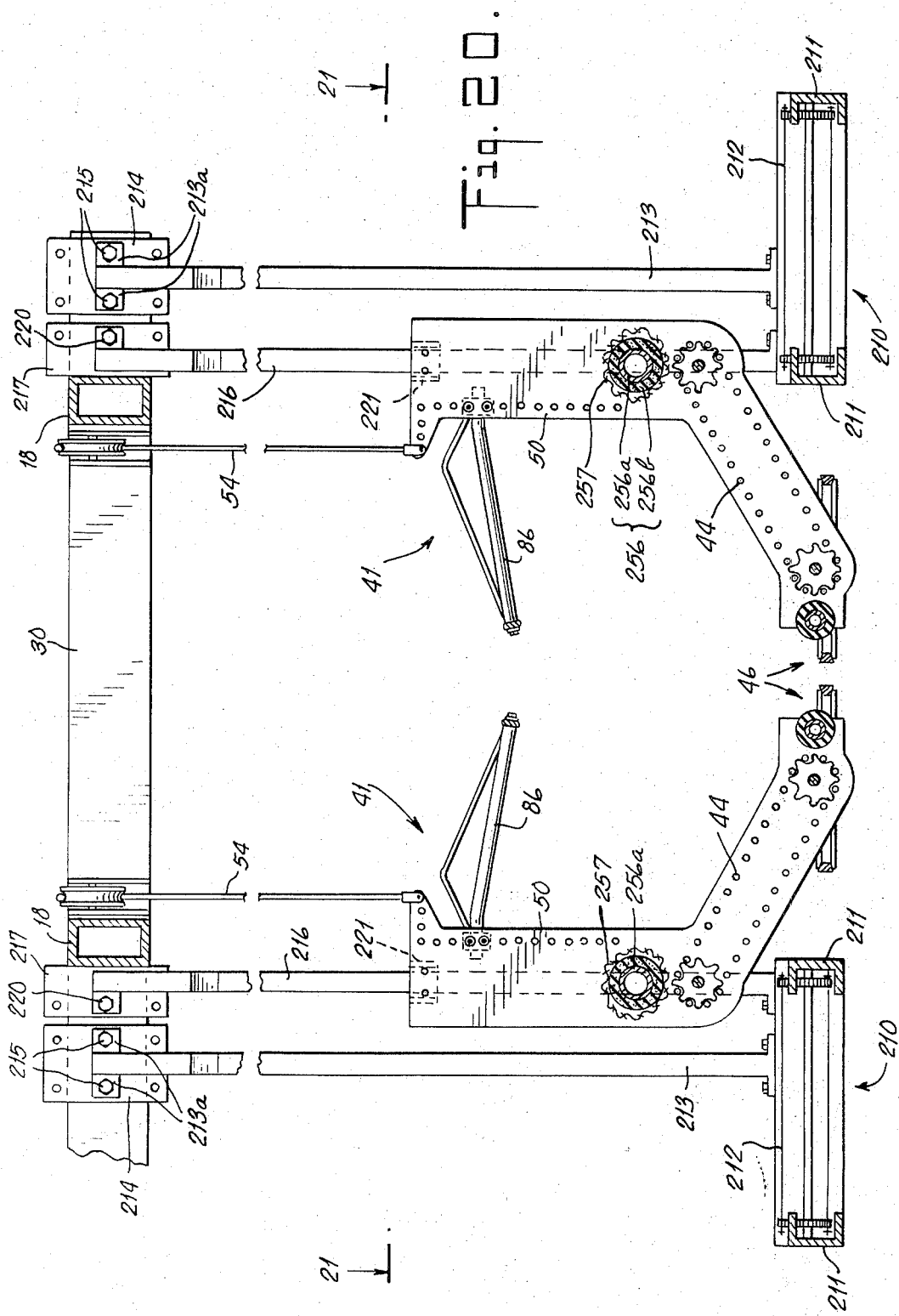
FIG. 20 is a fragmentary cross-sectional view taken on the line 20—20 of FIG. 19.

The longitudinal conveyors in this embodiment are generally indicated by the reference numeral 210, and correspond generally to longitudinal conveyors 130 of the previous embodiment. Each conveyor 210 includes a pair of longitudinal channelshaped frame members 211 (see FIG. 20) having their open sides facing each other and connected at their front ends to transverse frame members 212. The front ends of frame members 212 are supported by hanging columns 213, provided at their upper ends with wings 213a attached by bolts 215 to plates 214, welded to the front transverse frame member 30. Each column 213 is connected to a frame member 30 by two bolts 215. Each plate 214 is provided with three sets of bolt holes so that conveyors 210 may be set at three different elevations with respect to the frame member 30.

The back ends of the longitudinal conveyors 210 comprise an upwardly directed reach 236 having diagonally upwardly extending channel-shaped frame members 237.

Each frame member 237 comprises a channel section 237a abutting at its upper end against the lower end of an upper channel section 237b. The abutting ends are provided with ears 237c bolted together by bolts 238. Welded to the abutting end of each channel section 237a is a rearwardly extending member 242a. A similar, but shorter rearwardly extending member 242b is welded to the abutting end of each channel section 237b. The members 252a and 242b are bolted together by bolts 239. Diagonal truss members 240 and 241 connect the ends of the members 242b and 242a, resectiVely, to the upper end lower channel sections 237b and 237a, respectively. At their ends farthest from the frame members 237, the members 242a on the opposite sides of the conveyor are connected to a crossbar 243 which cooperates with a pair of angle iron uprights 244 welded to the rearmost transverse frame members 30. Each upright 244 has three bolt holes for receiving bolts 245, which attach the crossbar 253 to the uprights. By selecting the bolt holes, it is possible to adjust the height of the back end of the conveyor. Thus, the height of the back end of the conveyor may be adjusted to maintain the proper level as the height of the front end of the conveyor is adjusted by the bolts 215.

Figure 22:
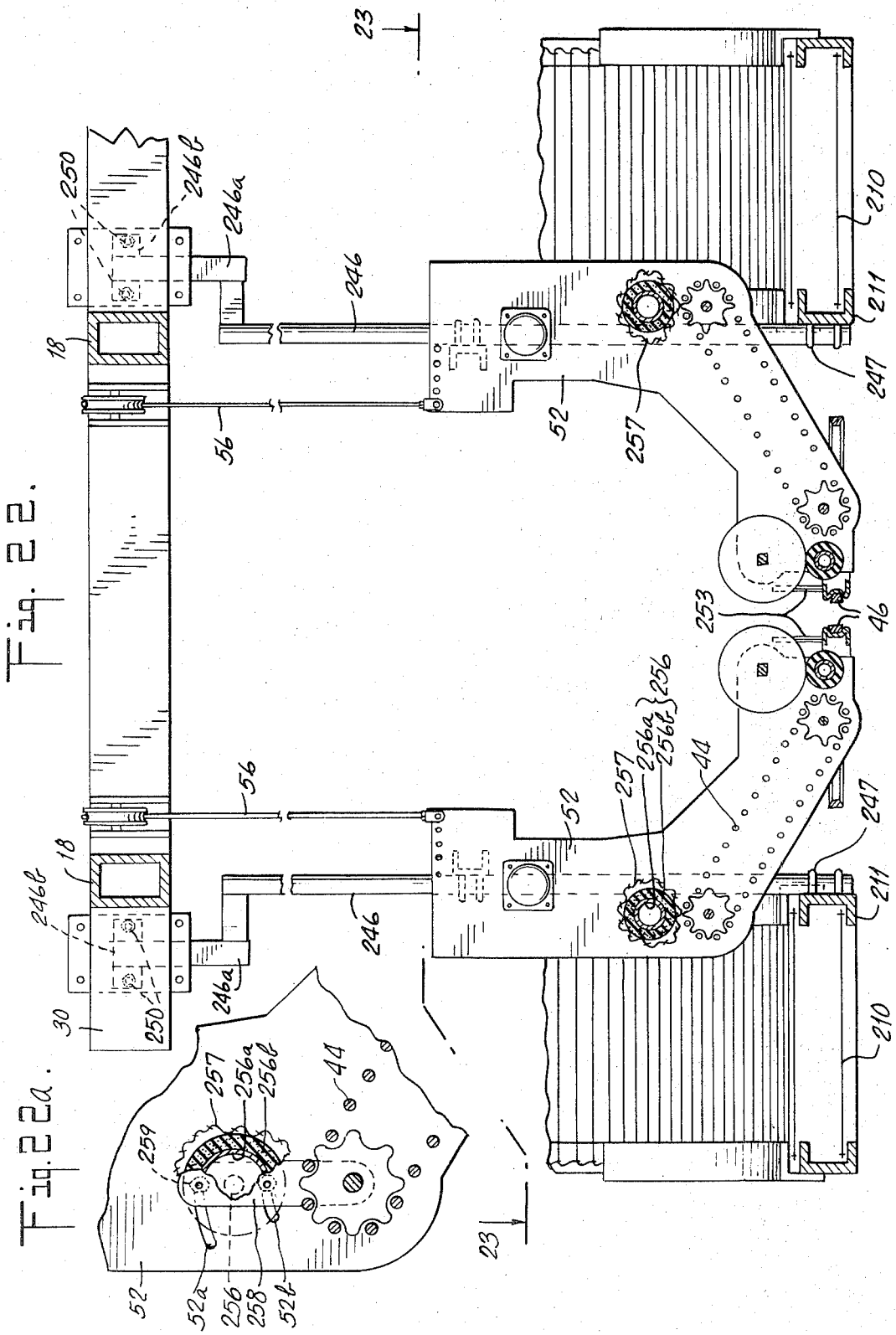
FIG. 22 is a cross-sectional view taken on the line 22—22 of FIG. 19.

The middle of the conveyor is supported by a pair of uprights 24b (FIGS. 19 and 22) whose lower ends are attached to the inner longitudinal frame members 211 by means of U-shaped yokes 247. The upper ends of the upright 246 are connected adjustably to a transverse frame member 30 by means of an offset extension 246a which carries at its upper end wings 246b having holes for receiving a pair of bolts 250.

The adjustment of the vertical position of the longitudinal conveyors is necessarily difficult to make, and requires the assistance of some form of jacking mechanism to support the conveyors while their height adjustment is being changed.

Note that the front transverse frame members 212 (FIG. 19) are not connected to the platform 24a under the driver's seat. The driver's seat 24b and related parts of the apparatus remain at a fixed elevation, regardless of changes in the height of the conveyors. Since the platform 24a and the driver's seat 24b are not supported from above by the uprights, such as 213, which support the longitudinal conveyors, as in FIG. 2, the frame members 251 which support those parts must be considerably strengthened as compared to the corresponding frame members 24 of the earlier modification. Compare the members 251 in FIG. 19 with frame members 24 in FIG. 2.

Another pair of vertical columns 216 (FIG. 20) are connected between respective transverse frame members 212 and a transverse frame member 30 of the harvester. The upper end of each column 216 is attached by a bolt 220 to a plate 216 welded to frame member 30 and provided with three sets of bolt holes so that the column 217 may be set in any of three vertical positions by means of its associated bolt 220.

Figure 21:
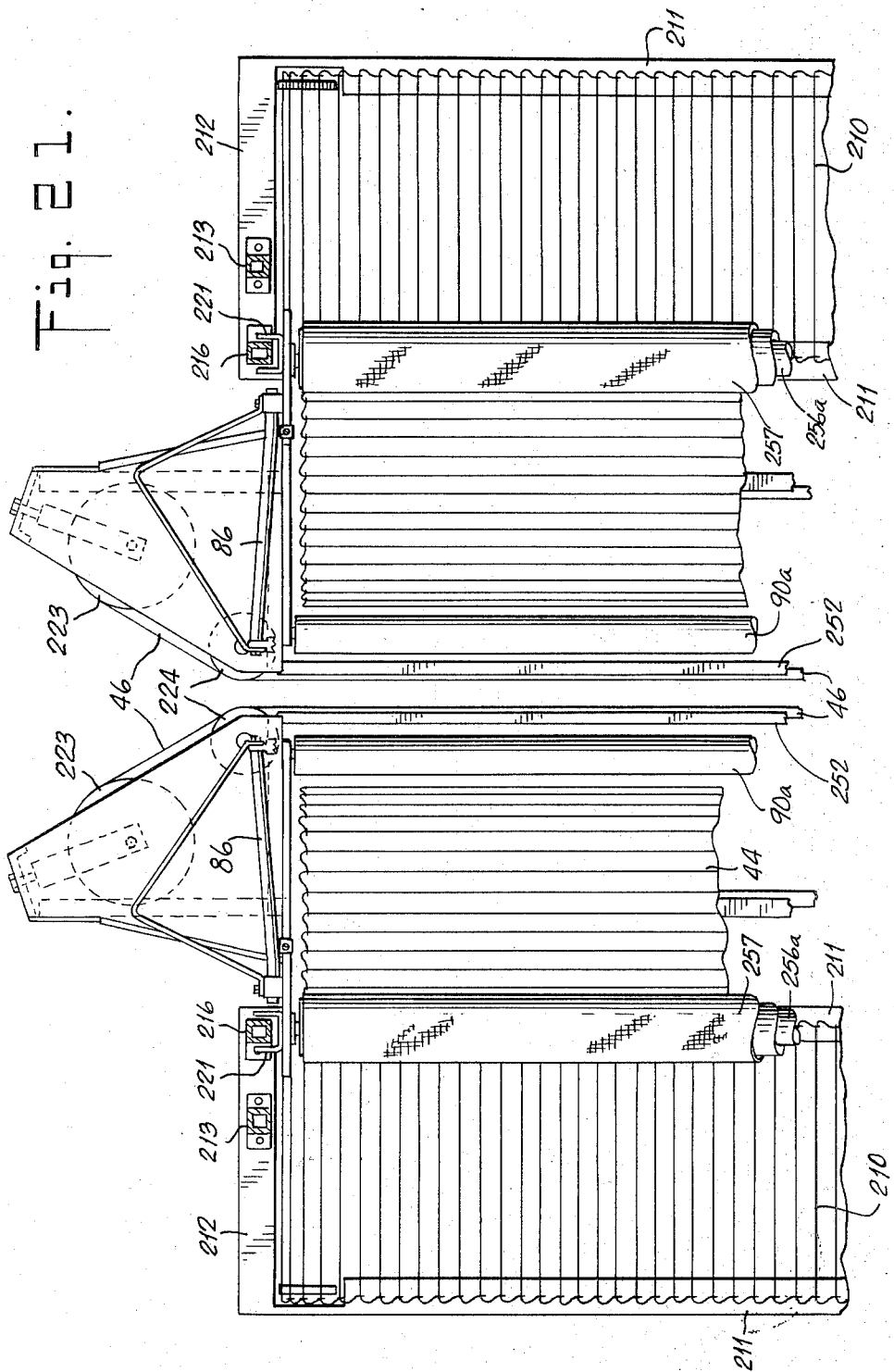
FIG. 21 is a cross-sectional view taken on the line 21—21 of FIG. 20.

Each carriage 41 is supported at its front end by means of a cable 54 as in the previous embodiments. The back end of each carriage 41 has a bracket 218 projecting rearwardly from plate 52 and carrying at its end a yoke 219, which encircles one of the uprights 246. This construction allows the back end of the carriage to pivot, but not to swing. When the bolts 215 and 220 are adjusted to place the conveyors 210 in ther lowest position, as is done when the harvester is making its first pass down a row of plants to harvest the lowest leaves on the plant, then a pair of U-shaped brackets 221 (FIGS. 20–21) are fastened to the front end plates 50 of the carriages. The arms of the U-shaped brackets extend on opposite sides of the columns 216 and prevent lateral swinging of the front ends of the carriages 41 on their cables 54. This swinging is permitted at higher settings of the carriages 41, so that the carriages 41 may swing to compensate for different leaning positions of the stalks in the row. However, during the first pass along the row, the stalks are in good alignment near their bases. The lateral swinging is not then needed and may in fact be detrimental to the proper operation of the harvester, in that it may allow the carriages either to plow the dirt or to damage the stalks. The brackets 221 are provided during that first primary operation to prevent the lateral swinging.

Adjustment of the bolts 220 in different sets of holes in their associated plates 217 sets the vertical positions of the carriages 41 corresponding to the vertical positions of the conveyors 210 established by the bolts 215, 245 and 250.

Figure 24:
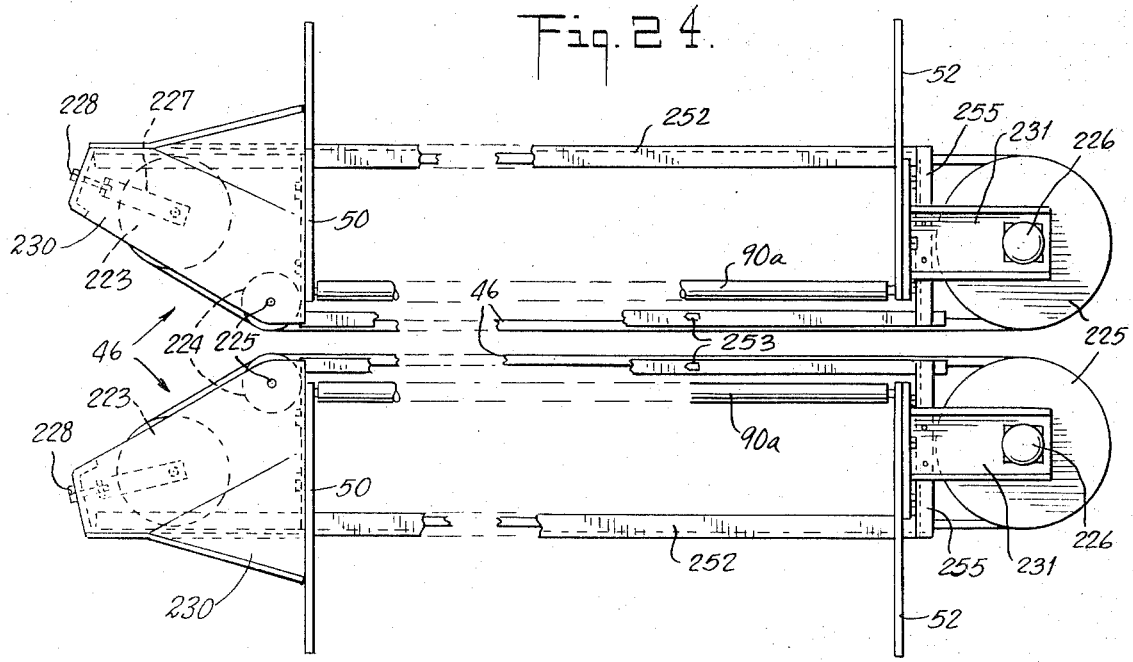
FIG. 24 is a fragmentary view, with certain parts removed, taken on the line 24—24 of FIG. 19.

When the carriages 41 are set in their lowermost position, the ground belts 46 project so low that they may occasionally tend to plow the ground. It is therefore desirable at such times to remove the ground belts and certain of their operating mechanisms, shown in FIG. 24, and replace them by ground rods 222, shown in FIGS. 25 and 26, having smaller space requirements. Furthermore, each ground rod 222 is shorter than the ground belts 46 and its supporting as shown in FIGS. 2, 5 and 9. The pulley arrangement for supporting each ground belt 46 in FIG. 24 is somewhat different from those shown in FIGS. 5 and 9, and includes two demountable pulleys 223 and 224 at the front of the harvester and a single large diameter pulley 225 at the rear of the harvester, driven by a hydraulic motor 226. The pulley 223 is mounted on a U-shaped bracket 227, which is attached by means of a bolt 228 to a plate 230 attached to the front plate 50 of the carriage 41. The bracket 227 is shiftable by bolt 228 to adjust the tension in belt 46. Each pulley 224 is mounted on a removable stub shaft 225 which is in turn mounted on the plate 230. The rear pulley 225 is supported on a bracket 231 projecting rearwardly from the back end plate 52 of the carriage. The bracket 231 is shiftable laterally along the plate 52 so that it can be moved laterally from the position shown in FIG. 24 (which appears in dotted lines in FIG. 25) to the full line position of FIG. 25, where the two pulleys 225 are more widely separated. The brackets 231 are so shifted when the ground belt 46 is removed so as to improve the clearance between the carriage 44 and the tobacco stalks.

Figure 25:
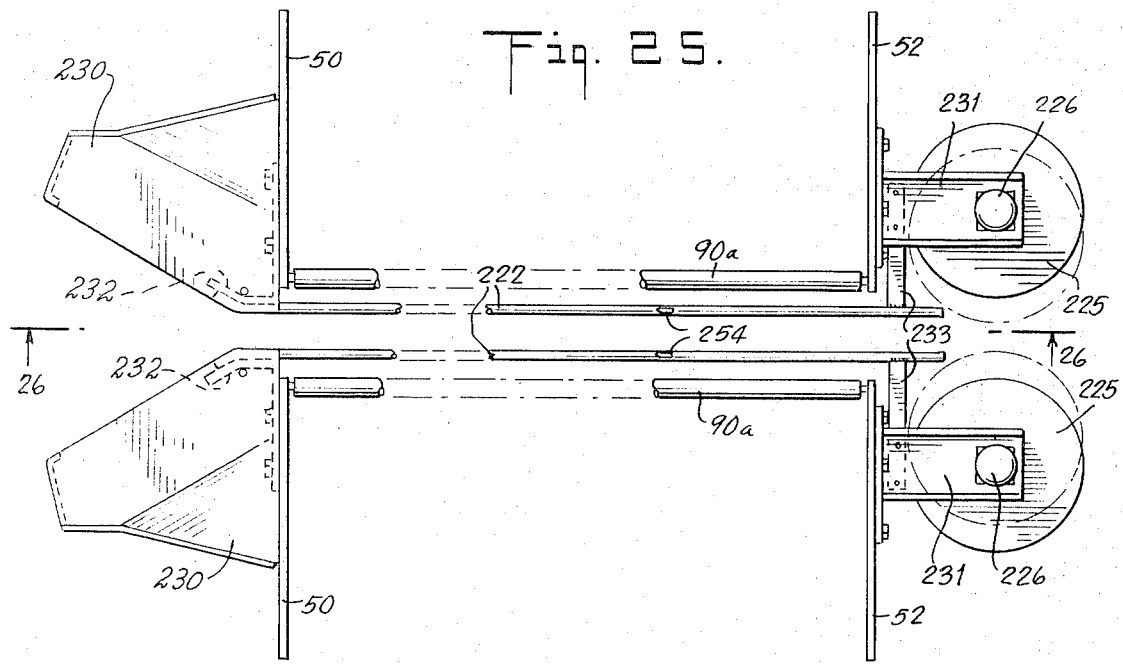
FIG. 25 is a view similar to FIG. 24, showing the ground belt replaced by a ground rod.

When the ground belts 46 are removed for harvesting the lowest tobacco leaves, the pulleys 223 and 224 are removed, and the pulleys 225 and brackets 231 are shifted to the positions shown in full lines in FIG. 25. The pulleys 225 and brackets 231 could be removed completely, except for the inconvenience of disconnecting the hydraulic motor 226.

The ground rod 222 is attached at its front end to a bracket plate 232, by which it may be mounted on the front plate 50 of the carriage. The back end of the ground rod 222 is welded to a cross-member 233 adapted for attachment by screws or the like to the bracket plate 231.

Thus, there are three clearance adjustments which are made when the harvester is making its lowest priming pass along a row of tobacco plants. First, the longitudinal conveyors 210 are adjusted to their lowest position. Second, the ground belts 46, and pulleys 223 and 224 are removed and replaced by ground rods 222. At the same time, the pulleys 225 are moved to a retracted position. Finally, the carriages 41 are lowered to their lowermost positions. The lowermost possible positions of the carriages 41 are determined by fixed flanges 234 (FIG. 19) on the back of each column 216, which cooperate with other fixed flanges 235 on the front surface of the forward supporting plate 50 of the carriage 41. The cooperating flanges 234 and 235 prevent the carriage 41 from being lowered too far.

SCAVENGER KNIFE

Figure 23:
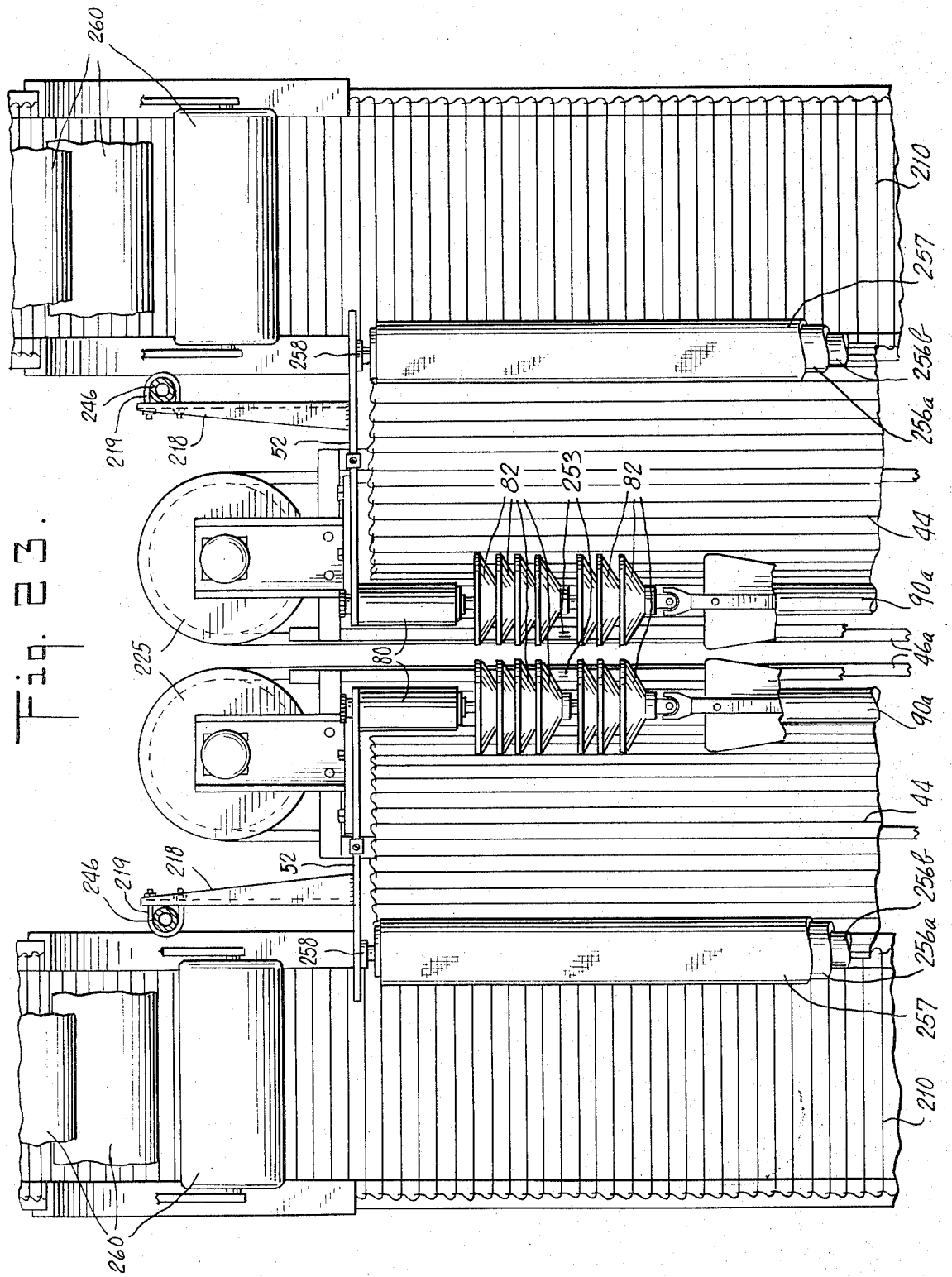
FIG. 23 is a cross-sectional view taken on line 23—23 of FIG. 22.

A frame 252 (FIG. 24) is attached to a crossbar 255 mounted on the back supporting plate 52 of the carriage 41. The frame 252 overlies the two longitudinal runs of one of the ground belts 46. The front end of the frame 252 is attached to the front plate 50. When the ground belt 46 is removed, the frame 252 is also removed. The inner side of the frame 252, nearest the stalks of tobacco, supports a vertically extending knife 253 at an intermediate point, part way along the assembly of scavenger discs 82. The lower end of the knife 253 is attached to the frame 252, as by welding. As may be seen in FIG. 23, the knives 253 engage any fibers which may be connecting a leaf to a stem, after the leaf has been gripped between the leading members of a set of scavenger discs 82 and their cooperating sponge rubber covered roller 90a, and before the leaf has been released from the grip of the trailing members of that set of discs 82. Consequently, any such connecting fibers are stretched across the knives 253 and are cut by the leading edges of those knives while so stretched.

Figure 26:
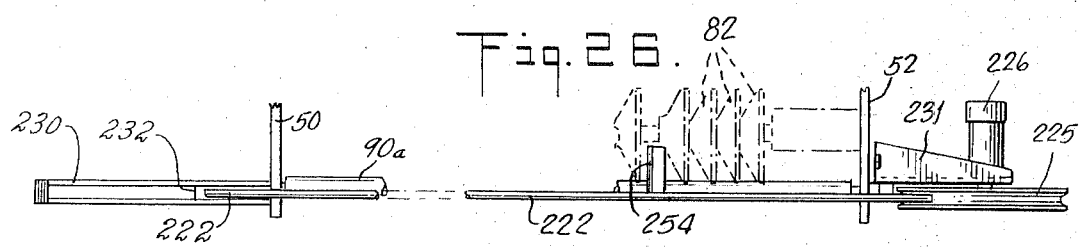
FIG. 26 is a cross-sectional view taken on the line 26—26 of FIG. 25.

When a ground belt assembly including the frame 252 is removed, the ground rod 222 which replaces the ground belt, supports a similar knife 254 (see FIGS. 25 and 26).

CONVEYOR MEANS

An idler roller 256 (FIGS. 20–23), comprising a hollow tubular core 256a and a cover 256b of sponge rubber or the like, cooperates with the upper end of conveyor 44. The rollers 90b of the other embodiments are similarly constructed. The sponge rubber covered roller 256 is enclosed within a fabric sleeve 257 of canvas or the like. The purpose of the sleeve 257 is to protect the sponge rubber cover 256b from the effects of sunlight, which causes the sponge rubber to deteriorate rapidly. The sponge rubber can withstand reasonably high temperatures, such as may be occasioned by friction and prolonged exposure to the sun through the fabric sleeve 257, but it is deteriorated rapidly if the sun's rays impinge directly on the sponge rubber. The sleeves 257 have no ill effect on the leaves carried by the conveyor, since the sleeves are backed up by sponge rubber at the point where they engage the leaves at the top of the conveyor chain 44.

Each sponge rubber covered roller 256 is journaled at its ends in arms 258 (FIG. 22a), carrying bolts 259 which are slidably adjustable in slots 52a, 52b (in end plate 52 corresponding slots not shown), in the end plate 50 so that the nip between the rollers 258 and the conveyors 44 may be adjusted to control the direction of the discharge of leaves from conveyor 44, as required by changes in elevation of that conveyor and of the longitudinal conveyor 210.

The longitudinal conveyors 210 have an array of similar sponge rubber covered rollers 260 either touching or spaced closely above their upwardly extending reaches 236. The spacing is preferably about one-eighth or one-fourth inch, being chosen so that when a tobacco leaf enters between a conveyor 210 and a roller 260, the roller is frictionally driven by the conveyor, acting through the leaf, but there is little or no crushing of the leaf. The spacing of roller 256 and conveyor 44 is similarly chosen. Each roller 260 comprises a sponge rubber layer fixed to the outside of a tubular shaft 261. The uppermost group of sponge rubber rollers have their shafts 261 attached to hubs which are journalted in frames 262. Frames 262 are adjustable toward and away from the frames 237b that support the conveyor to compensate for wear on the rollers 260. The frames 262 have sleeves 262a (FIGS. 27 and 30) welded to the outside thereof. These sleeves 262a encircle rods 265 and are clamped between pairs of nuts 264 which engage the rods 265. The lower ends of rods 265 are bent over and welded to the frames 267, as best seen in FIG. 30.

The lower group of rollers 260 is journaled in a similar pair of frames 262, provided with similar wear compensation adjustment mechanism.

Figure 19:
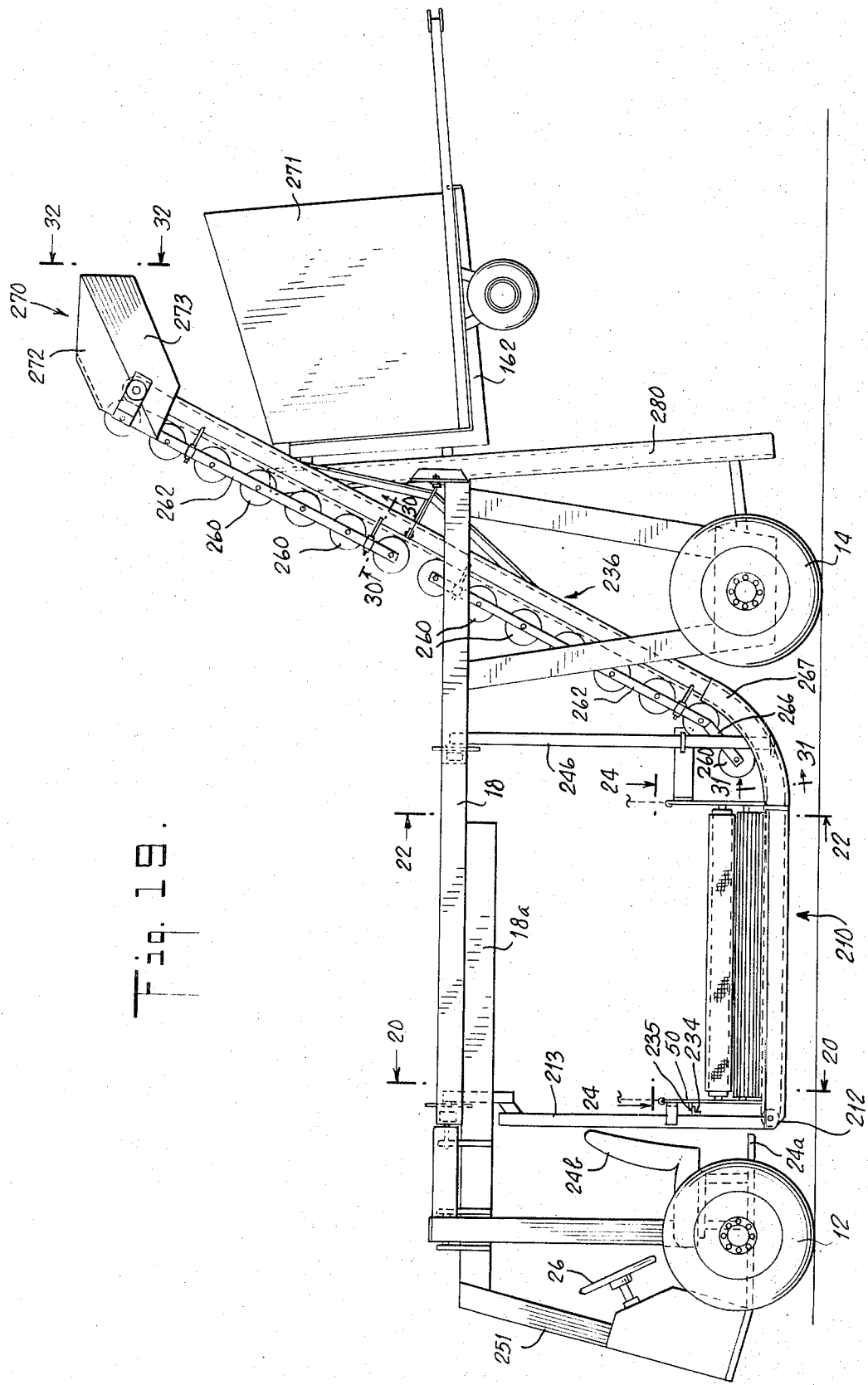
FIG. 19 is a side elevational view of a modified form of apparatus, with certain parts removed.

The lowermost rubber roller 260, as may be seen in FIG. 19, is journaled on a pair of links 266 which are pivoted at their upper ends to the lower ends of frame members 262 carrying the lower array of rubber covered rollers 260. Between the horizontal frame members 211 which guide the conveyor 210 on its horizontal reach and the frame members 237 which guide the conveyor on its upwardly extending reach, there are provided a pair of arcuate frame members 267 (FIGS. 19 and 31) which are channel-shaped in cross-section, like the frame members 211 and 237, but have an angle iron 268 welded thereto to provide a channel for receiving and guiding the upper run of the conveyor chain 270 (see FIG. 31). Each flange of the frame member 267 is shown as having a nylon wear strip 269 on which the links of conveyor 210 slide. Another nylon wear strip 268a is provided on the under side of the angle iron 268, to guide the conveyor links as they change from horizontal to upward motion.

Each of the rollers 260 on the upwardly extending reach 236 is provided with a fabric sleeve (not shown) similar to that shown at 257 on the roller 256.

At the top of the upwardly extending conveyor reach 236, there is provided a hood 270 (FIGS. 19 and 32). The hood 270 functions to engage upwardly moving leaves leaving the conveyor and direct them downwardly into the trailer 271 supported immediately below the discharge end of the conveyor. It also functions to protect the leaves from transverse winds which might tend to blow the tobacco leaves laterally so that they would not fall into the trailer receptacle 271. Each hood comprises an upper channel-shaped section 272 and a pair of downwardly and outwardly flaring wings 273 attached to the lower ends of the sides of channels 272. The channels 273 are provided with suitable openings (FIG. 32) to receive the drive shaft 274 between the sprocket wheels 275 at the discharge ends of the conveyors 210, and to receive a hydraulic motor 276 which is driving those sprocket wheels under the control of the operator.

TRAILER RECEPTACLE AND FORK LIFT

The fork lift 162 may be similar to that described in the previous embodiment of the invention. Channel 280 in which the fork lift travels are tilted forwardly all the way from their lower ends to their upper ends. There is no vertical section such as shown at the lower part of the fork lift in FIG. 2.

Figure 33:
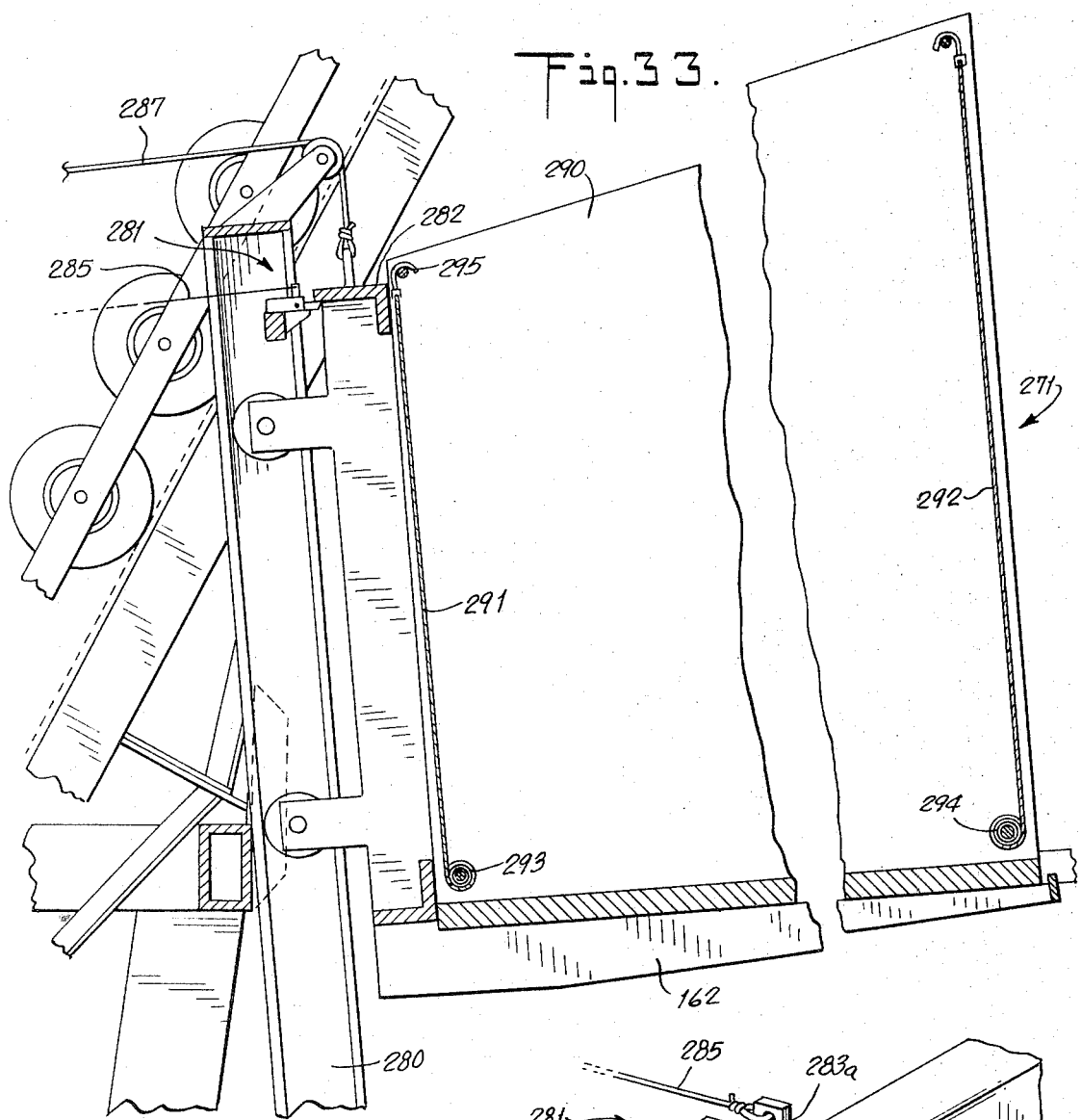
FIG. 33 is a cross-sectional view taken on the line 33—33 of FIG. 28.
Figure 34:
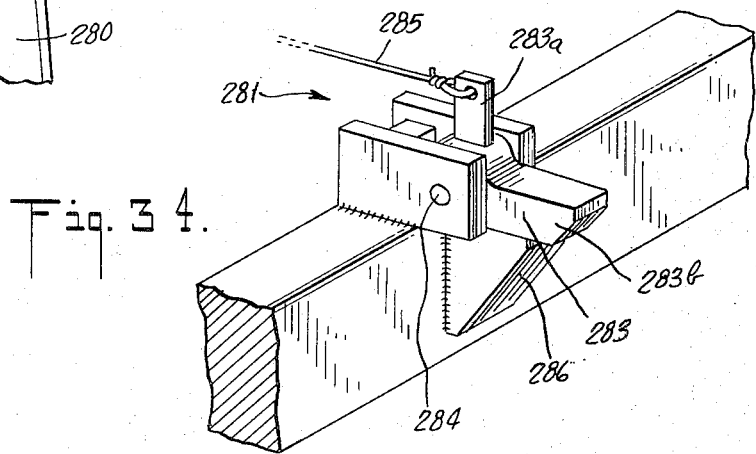
FIG. 34 is a perspective view showing the trailer latching mechanism.

Near the top of each channel 280, there is provided a latch 281 best seen in FIGS. 33 and 34, which is adapted to engage a crossbar 282 on the fork lift and hold the trailer 271 in its uppermost position, even though the engine of the harvester may be cut off or the supply of fluid under pressure to the hydraulic motor which elevates the trailer may be discontinued.

As best seen in FIG. 34, each latch 281 comprises a bell crank lever 283 pivoted at 284, having a horizontally extending arm adapted to engage the crossbar 282 on the trailer and a vertically extending arm 283a attached to a cable 285, by which the latch may be tripped.

When the trailer is first lifted to its uppermost position, it is run upwardly past the latch 281. The lever 283 is free to turn upwardly about 90 from the position shown in the drawings, so that the crossbar 282 can readily pass it. The lever 283 then drops back to the position shown, where the lower arm 283b is resting against a fixed abutment 286. The fork lift 162 may then be released by the cables 287, and it moves back down onto the latches 281, where it is held. When it is desired to lower the trailer, it must first be lifted off the latches 281 by cables 287, which may then be released by pulling on the cables 285. Then the fork lift 162 and trailer 271 may be lowered to the position where the trailer engages the ground.

The trailer 271 is sufficiently wide to extend across the discharge ends of both the conveyors, as best seen in FIG. 35.

The trailer is provided with two rigid end walls 290 and its front and rear walls are in the form of fabric curtains 291 and 292, which are rolled on conventional curtain rods 293 and 294. When the trailer is receiving tobacco, the curtains are pulled up and hooked over eyes 295 provided in the end walls 290. When it is desired to unload the tobacco from the trailer, the curtains are lowered. The use of the retractable curtains 291 and 292 facilitates unloading of the trailer after it is removed from the harvester and taken to the tobacco processing shed.

We claim:

1. Apparatus for harvesting tobacco leaves, comprising
   a. a vehicle adapted to pass along a row of tobacco plants;
   b. a pair of spaced elongated defoliators mounted on said vehicle, which defoliators define therebetween a plant passageway, said defoliators being rotatable about axes extending along said passageway, said defoliators being operable to engage leaves on tobacco plants in the passageway, strip the leaves from the stalks, and drop the leaves;
   c. leaf removal means located on the vehicle adjacent the defoliators for catching and removing leaves stripped from plants and dropped by said defoliators, said leaf removal means comprising a pair of wire chain conveyors located on opposite sides of said plant passageway and each inclined upwardly from a receiving end under a defoliator to a discharge end from which the leaves are dropped, each said conveyor comprising a plurality of parallel spaced bars linked at their ends, said bars extending parallel to the plant passageway;
   d. a pair of longitudinal conveyor means on the vehicle, each positioned laterally outwardly from one of said wire chain conveyors and extending from a receiving end below the discharge end of said one wire chain conveyor, to a discharge end above the normal height of tobacco plants, from which discharge end the leaves are dropped; and
   e. a collecting receptacle on said vehicle in a position bridging the plant passageway above the normal height of tobacco plants and below the discharge ends of said pair of longitudinal conveyor means, so as to catch the leaves dropped from both longitudinal conveyor means.

2. Apparatus as in claim 1, in which each wire chain conveyor comprises:
   a. a plurality of sections with the wire bars thereof extending longitudinally of the vehicle;
   b. a common drive shaft for all said sections;
   c. a common idler shaft for all said sections;
   d. a pair of drive sprockets for each section on said drive shaft; and
   e. a pair of idler sprockets for each section on the idler shaft.

3. Apparatus for harvesting tobacco leaves, comprising:
   a. a vehicle adapted to pass along a row of tobacco plants;
   b. a pair of spaced elongated defoliators mounted on said vehicle, which defoliators define therebetween a plant passageway, said defoliators being rotatable about axes extending along said passageway and operable to engage leaves on tobacco plants in the passageway, strip the leaves from the stalks, and drop the leaves;
   c. leaf removal means comprising a pair of conveyors located on the vehicle under the respective defoliators for catching leaves stripped from plants and dropped by said defoliators and moving said leaves laterally away from said passageway;
   d. a pair of longitudinal conveyor means on the vehicle, each positioned laterally outwardly from one conveyor of said leaf removal means and extending from a receiving end below the discharge end of said one conveyor to a discharge end above the normal height of tobacco plants, each said conveyor means comprising a wire chain conveyor including a plurality of parallel spaced bars linked at their ends, said bars extending at right angles to the intended direction of conveyor movement when in operation; and
   e. a collecting receptacle on the vehicle below the discharge ends of said longitudinal conveyor means for collecting the tobacco leaves discharged therefrom.

4. Apparatus as in claim 3, in which said leaf removal means comprises a pair of wire chain conveyors located on opposite sides of said plant passageway and each inclined upwardly from a receiving end under a defoliator to a discharge end from which leaves are dropped, each said conveyor comprising a plurality of parallel spaced bars linked at their ends, said bars extending parallel to said plant passageway.

5. Apparatus as in claim 3, in which each said wire chain conveyor consists of a single continuous conveyor having a horizontal reach extending below the discharge end of a leaf removal means, a diagonal reach extending upwardly from one end of the horizontal reach and a curved section connecting the horizontal reach to the diagonal reach.

6. Apparatus as in claim 5, including means at said curved section for guiding the upper run of the conveyor along a curved path, said guiding means comprising, for each conveyor, a pair of guide members of channel-shaped cross-section and of curved longitudinal contour, each guide member receiving one margin of the conveyor within its channel.

7. Apparatus for harvesting tobacco leaves comprising:
   a. a vehicle adapted to pass along a row of tobacco plants;
   b. a defoliator mechanism on the vehicle for stripping selected leaves from tobacco plants; and
   c. means on the vehicle for conveying away from the defoliator mechanism tobacco leaves stripped from plants by the defoliator mechanism, said conveying means comprising:
      1. wire chain conveyor means including a plurality of wire links, each link including a wire crossbar extending transversely of the conveyor, and portions integral with said wire crossbar and bent away from the direction of travel thereof, and terminal loops integral with said end portions, both the terminal loops on each crossbar encircling the crossbar of the succeeding link.

8. Tobacco leaf harvesting apparatus as in claim 7, in which said leaf conveying means comprises:
   a. a single continuous conveyor having a horizontal reach, a diagonal reach extending upwardly from the downstream end of the horizontal reach and a curved section connecting the horizontal reach to the diagonal reach;
   b. a plurality of rollers, each having at least an external layer of sponge rubber; and
   c. a mounting frame for said rollers, means supporting said frames parallel to said diagonal reach, said frame supporting said rollers in compressive engagement with the conveyor so that the sponge rubber layers hold the leaves firmly on the wire chain conveyor.

9. Tobacco leaf harvesting apparatus as in claim 8, including:
   a. another roller, having at least an external layer of sponge rubber; and
   b. a pair of pivot arms mounted on said frame and supporting said other sponge rubber covered roller below said frame and compressively engaging said conveyor at the junction between said horizontal reach and said diagonal reach.

10. Apparatus for harvesting tobacco leaves, comprising:
    a. a vehicle adapted to pass along a row of tobacco plants;
    b. a pair of spaced elongated defoliators mounted on said vehicle, which defoliators define therebetween a plant passageway, said defoliators being rotatable about axes extending along said passageway, said defoliators being operable to engage leaves on tobacco plants in the passageway, strip the leaves from the stalks, and drop the leaves;
    c. a pair of gleaners, each located rearwardly from one of the defoliators and rotatable about an axis parallel to said passageway, and a pair of rollers running in contact with said gleaners, each of said gleaners comprising a group of gleaner discs, said discs being cup shaped and having their concave surfaces facing rearwardly;
    d. leaf removal means located on the vehicle adjacent the defoliators and gleaners for catching and removing leaves stripped from plants and dropped by said defoliators and gleaners, said leaf removal means comprising a pair of conveyors, each extending from a receiving end under a defoliator to a discharge end from which leaves are dropped;
    e. a pair of longitudinal conveyor means on the vehicle, each positioned laterally outwardly from one of said leaf removal means and extending longitudinally of the vehicle from a receiving end below the discharge end of one of said leaf removal conveyors to a discharge end above the normal height of tobacco plants from which discharge end leaves are dropped; and
    f. a collecting receptacle on said vehicle in a position bridging the plant passageway above the normal height of tobacco plants and below the discharge ends of said pairs of longitudinal conveyor means, so as to catch the leaves dropped from both longitudinal conveyor means.

11. Apparatus as in claim 10, in which said gleaner discs are of flexible material.

12. Apparatus for harvesting tobacco leaves, comprising:
    a. a vehicle adapted to pass along a row of tobacco plants;
    b. a defoliator mechanism on the vehicle for stripping selected leaves from the tobacco plants; and
    c. gleaner means on the vehicle rearwardly of the defoliator mechanism, comprising:
       1. flexible means adapted to remove hanging leaves from stalks as the vehicle passes plants, said flexible means being mounted on the vehicle so as to move along a path parallel to the row of tobacco plants; and
       2. knife means on the vehicle and rearwardly of at least part of the flexible means, said knife means being mounted to move along a path spaced from the stalks, and effective to sever fibrous connections remaining between the leaves and the stalks.

13. Tobacco leaf harvesting apparatus as in claim 12, in which said knife is located at an intermediate point along the length of the gleaner means.

14. Tobacco leaf harvesting apparatus as in claim 12, in which said knife is vertical.

15. Tobacco leaf harvesting apparatus as in claim 12, including a ground belt on said vehicle for engaging the tobacco plant stalks just above the ground level, and a frame for guiding said ground belt under the gleaner means, said frame supporting said knife means.

16. Tobacco leaf harvesting apparatus as in claim 12, including a ground rod on said vehicle and extending along the harvester under the gleaner means, said ground rod supporting said knife means.

17. Apparatus for harvesting tobacco leaves, comprising:
    a. a vehicle adapted to pass along a row of tobacco plants;
    b. a pair of defoliators mounted on said vehicle, which defoliators define therebetween a plant passageway, said defoliators being rotatable about axes extending along said passageway, said defoliators being operable to engage leaves on tobacco plants in the passageway, strip the leaves from the plants and drop the leaves;
    c. each of said defoliators having its opposite longitudinal edges differently configured such that an end portion of one edge is defined by a gradually increasing radius from the axis and the corresponding portion of the opposite edge is defined by an abruptly increasing radius, whereby cooperating edges of the two defoliators come together in a staggered relationship;
    d. leaf removal means on the vehicle comprising a pair of lateral conveyors, each extending from a receiving end under a defoliator to a discharge end, for catching and removing leaves dropped by said defoliators;
    e. a pair of longitudinal conveyor means on the vehicle, each positioned laterally outwardly from one of said lateral conveyors and extending longitudinally of the vehicle from a receiving end below the discharge end of said one lateral conveyor to a discharge end above the normal height of tobacco plants, from which discharge end the leaves are dropped; and
    f. collecting receptacle means below the discharge ends of said longitudinal conveyor means for receiving the leaves dropped therefrom.

18. Apparatus for harvesting tobacco leaves, comprising:
    a. a vehicle adapted to straddle at least one row of tobacco plants;
    b. a pair of spaced elongated defoliators mounted on said vehicle, which defoliators define therebetween a plant passageway, said defoliators being rotatable about axes extending along said passageway;
    c. means for rotating the defoliators about their axes concurrently with the forward motion of the vehicle; and d. at least one flexible web on each defoliator extending outwardly from said axis and adapted to engage the stalks of the tobacco plants, the webs having scalloped edges, and the scallops on each web being staggered longitudinally of the vehicle with respect to the scallops on the web on the opposite side of the passageway, so that when a stalk is engaged by a projecting scallop on one defoliator, it is located between projecting scallops on the opposite defoliator.

19. Apparatus for harvesting tobacco leaves comprising:
   a. a vehicle adapted to pass along a row of tobacco plants;
   b. a pair of spaced elongated defoliators on the vehicle, which defoliators define therebetween a plant passageway, said defoliators being operable to engage plants in the passageway and remove leaves therefrom;
   c. a pair of conveyor means on the vehicle located on opposite sides of the passageway for receiving leaves removed by the respective defoliators, each said conveyor means including a longitudinal conveyor extending parallel to the plant passageway; and
   d. a trailer having supporting wheels and a body wider than the distance between the outside edges of the two longitudinal conveyors;
   e. each said longitudinal conveyor including an upwardly extending reach for lifting the harvested leaves to a discharge end above the tops of the tobacco plants; and
   f. lift means on the vehicle for engaging the trailer and lifting it from a running position where its wheels are on the ground to a loading position aligned with and below the discharge ends of both of the longitudinal conveyors, so that the leaves may fall from the discharge ends of the conveyors into the trailer.

20. Apparatus for harvesting tobacco leaves comprising:
   a. a vehicle adapted to pass along a row of tobacco plants;
   b. a pair of spaced elongated defoliators on the vehicle, which defoliators define therebetween a plant passageway, said defoliators being operable to engage plants in the passageway and remove leaves therefrom;
   c. means for raising and lowering the defoliators to harvest leaves at selected elevations;
   d. a pair of conveyor means on the vehicle located on opposite sides of the passageway for receiving leaves removed by the respective defoliators, each said conveyor means including a longitudinal conveyor extending parallel to the passageway; and
   e. means for vertically adjusting the positions of said longitudinal conveyors, independently of the vertical position of the defoliators.

21. Apparatus as in claim 20, including:
   a. a frame for said vehicle;
   b. front, intermediate, and rear supports for each longitudinal conveyor, and connections between said supports and said frame; and
   c. means in said conveyor position adjusting means for vertically adjusting each of said connections to change the elevation of the conveyor with respect to the vehicle.

22. Apparatus as in claim 20, including means for vertically adjusting the position of the defoliators with respect to the vehicle, independently of the vertical position of the longitudinal conveyors.

23. Apparatus for harvesting tobacco leaves, comprising:
   a. a vehicle adapted to pass along a row of tobacco plants;
   b. an elongated defoliator mounted on said vehicle and extending longitudinally thereof, said defoliator being rotatable about an axis extending longitudinally of the vehicle;
   c. means for rotating the defoliator about its axis concurrently with the forward motion of the vehicle; and
   d. flexible web means on the defoliator extending outwardly in diametrically opposite directions from said axis and adapted to engage the stalks of tobacco plants, said web means having a radius with reference to said axis which varies cyclically along the longitudinal dimension of said axis, the cyclical variations on one side of the axis being out of phase with respect to the cyclical variations on the opposite side of the axis.

24. Apparatus for harvesting tobacco leaves, comprising:
   a. a vehicle adapted to straddle at least one row of tobacco plants;
   b. a pair of spaced elongated defoliators mounted on said vehicle, which defoliators define therebetween a plant passageway, said defoliators being rotatable about axes extending along said passageway;
   c. means for rotating the defoliators about their axes concurrently with the forward motion of the vehicle; and
   d. at least one flexible web on each defoliator extending outwardly from the axis thereof and adapted to engage the stalks of tobacco plants in said passageway, each said web having a radius with reference to said axis which varies cyclically along the longitudinal dimension of said axis, the cyclical variation on one side of the passageway being out of phase with that on the opposite side of the passageway, so that when one side of a stalk is engaged by a large radius portion of the web, the other side of the stalk is engaged by a smaller radius portion of the web.

25. Apparatus as in claim 24, in which each defoliator has flexible web means extending outwardly in diametrically opposite directions from its axis, and the cyclical variations of the web radius on one side of the axis are out of phase with the cyclical variations on the other side.

* * * * *